United States Patent [19]
Marola

[11] Patent Number: 5,249,911
[45] Date of Patent: * Oct. 5, 1993

[54] TRUCK TOWING BOOM

[75] Inventor: Martin A. Marola, Goshen, Conn.

[73] Assignee: Tru-Hitch, Incorporated, Torrington, Conn.

[*] Notice: The portion of the term of this patent subsequent to Nov. 17, 2009 has been disclaimed.

[21] Appl. No.: 887,301

[22] Filed: May 22, 1992

Related U.S. Application Data

[63] Continuation-in-part of Ser. No. 670,248, Mar. 15, 1991, Pat. No. 5,163,803.

[51] Int. Cl.⁵ .............................................. B60P 3/12
[52] U.S. Cl. ...................................... 414/563; 280/402
[58] Field of Search ......................... 414/563, 642, 664; 280/402, 425.2, 441.2

[56] References Cited

U.S. PATENT DOCUMENTS

| | | | |
|---|---|---|---|
| 3,687,315 | 8/1972 | Donaldson | 414/563 |
| 3,715,042 | 2/1973 | Rellinger | 414/563 |
| 4,384,817 | 5/1983 | Peterson | 414/563 |
| 4,423,885 | 1/1984 | Carney et al. | 280/441.2 |
| 4,434,993 | 3/1984 | Curtis | 414/563 |
| 4,640,660 | 2/1987 | Watson | 414/563 |
| 4,664,585 | 5/1987 | Ambridge et al. | 414/563 |
| 4,775,285 | 10/1988 | Zackovich | 414/563 |
| 4,797,058 | 1/1989 | Bilas | 414/563 |
| 4,840,534 | 6/1989 | Totty | 414/563 |
| 4,842,472 | 6/1989 | Plant | 414/563 |
| 4,861,221 | 8/1989 | Krisa | 414/563 |
| 5,040,815 | 8/1991 | Evans | 280/425.2 |

*Primary Examiner*—Frank E. Werner
*Assistant Examiner*—James Keenan
*Attorney, Agent, or Firm*—Chilton, Alix & Van Kirk

[57] ABSTRACT

A boom assembly attaches to the fifth wheel of a tractor for towing a truck or other vehicle. The assembly has a pair of uprights and a pair of pivotally mounted legs. Hydraulic cylinders are actuated to force the legs to a pivoted position which lifts the legs and the towed truck to an elevated position for towing. The legs may be supported by a collapsable wheel assembly. The vehicle is secured by a specially configured hook and a variably positionable front wheel assembly receiver. Extensions in the legs include rollers to facilitate positioning. The boom assembly may be variably vertically positioned and is collapsable to a compact storage configuration.

35 Claims, 20 Drawing Sheets

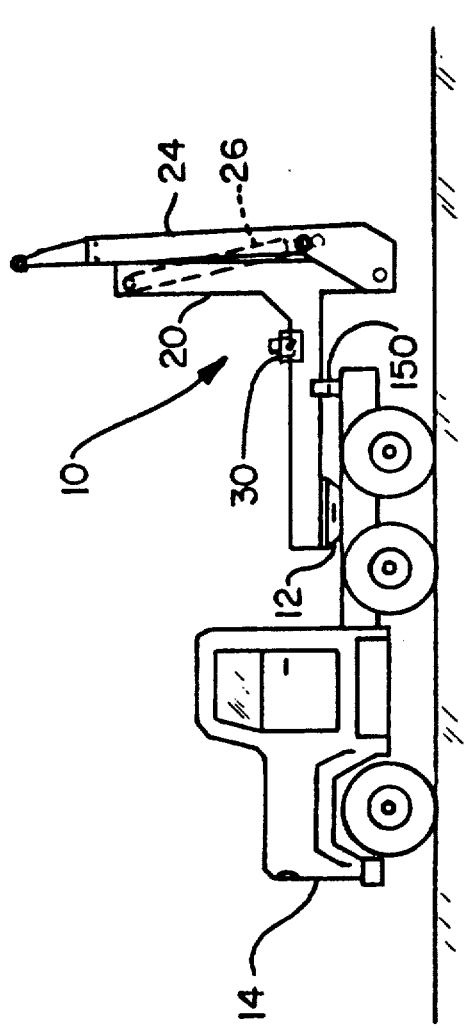
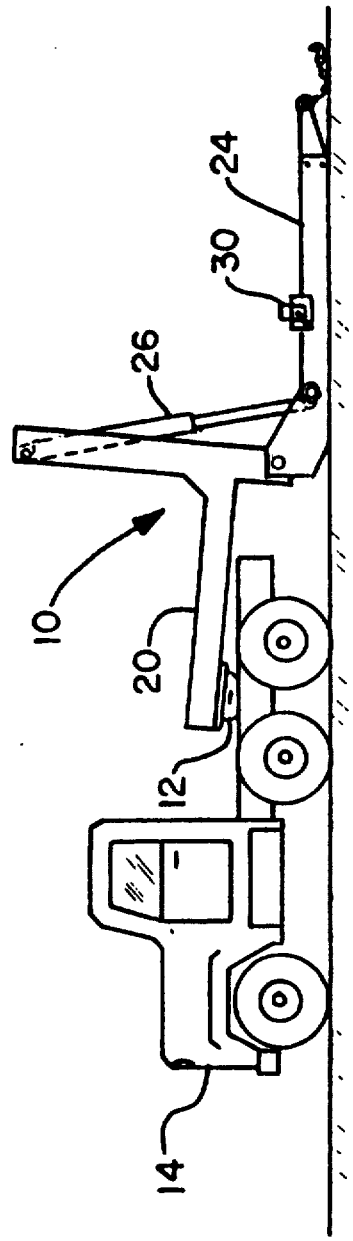

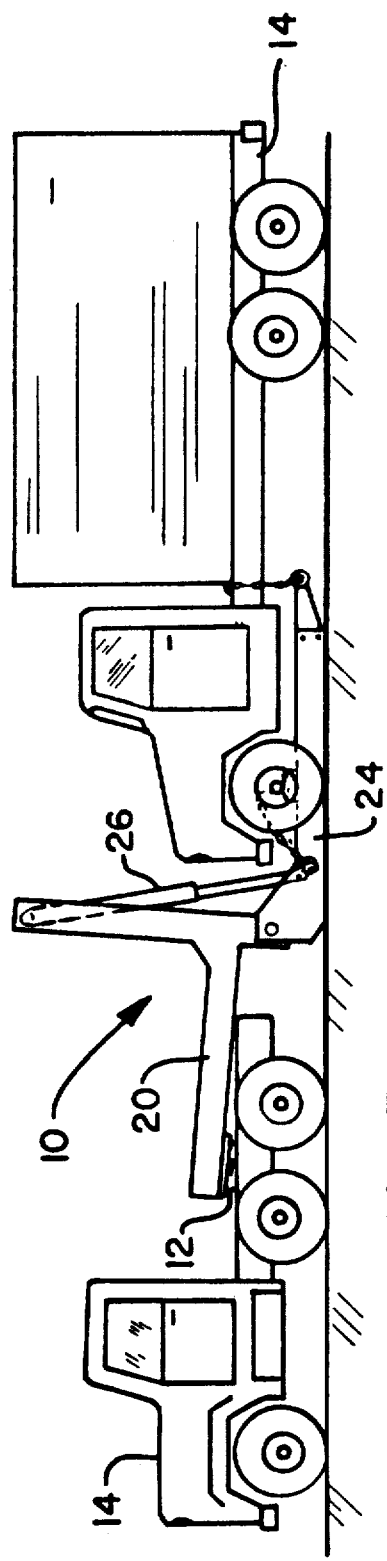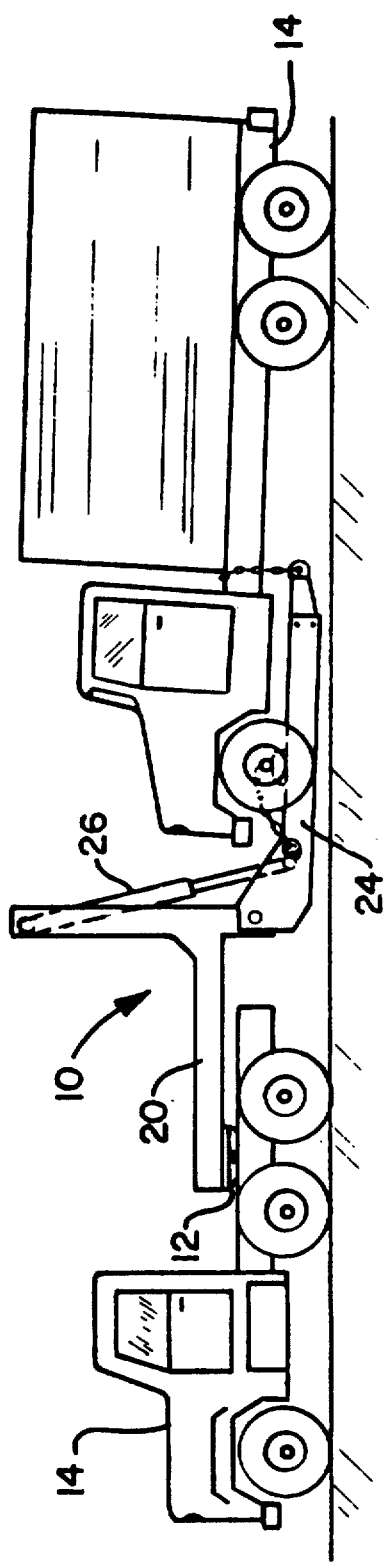

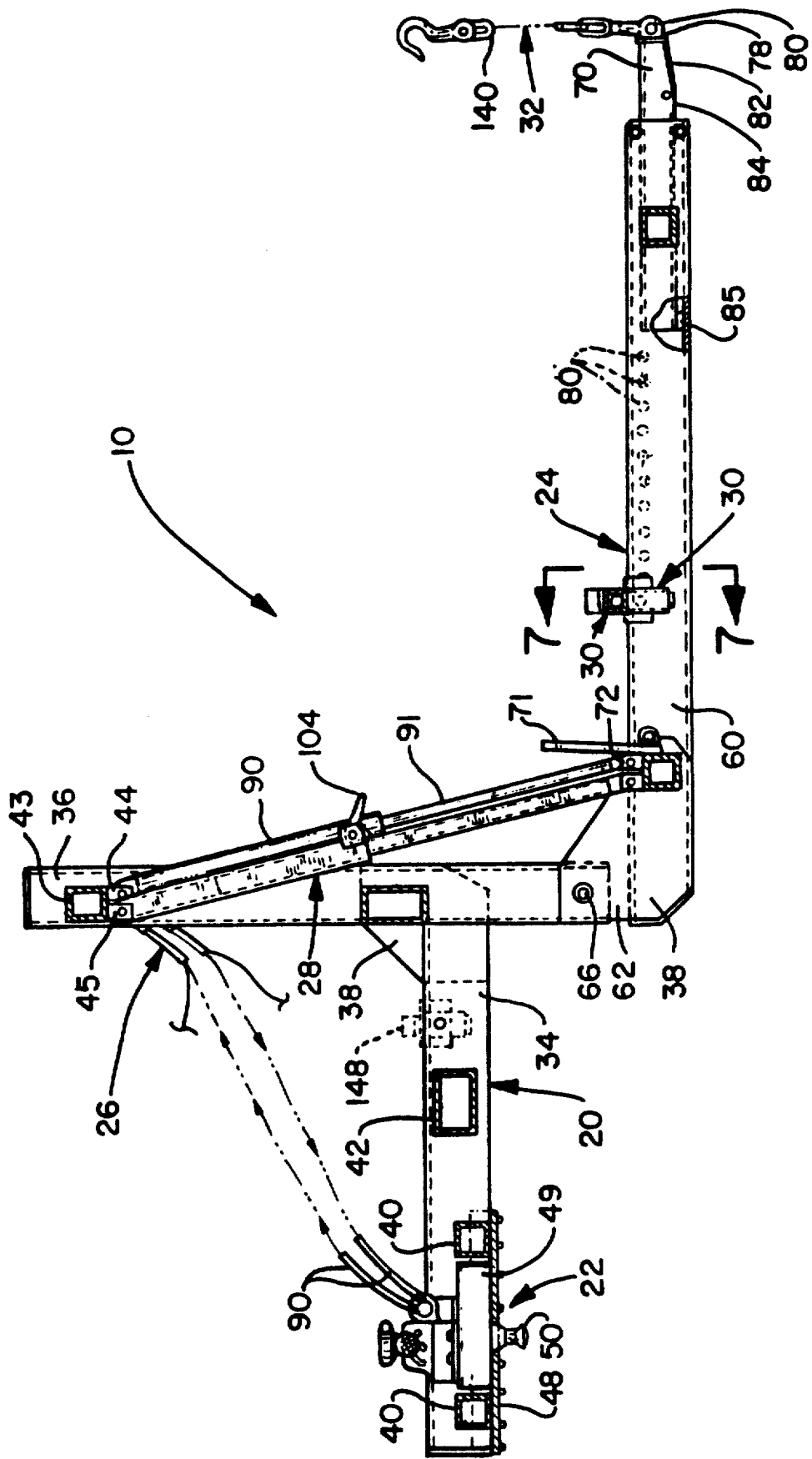

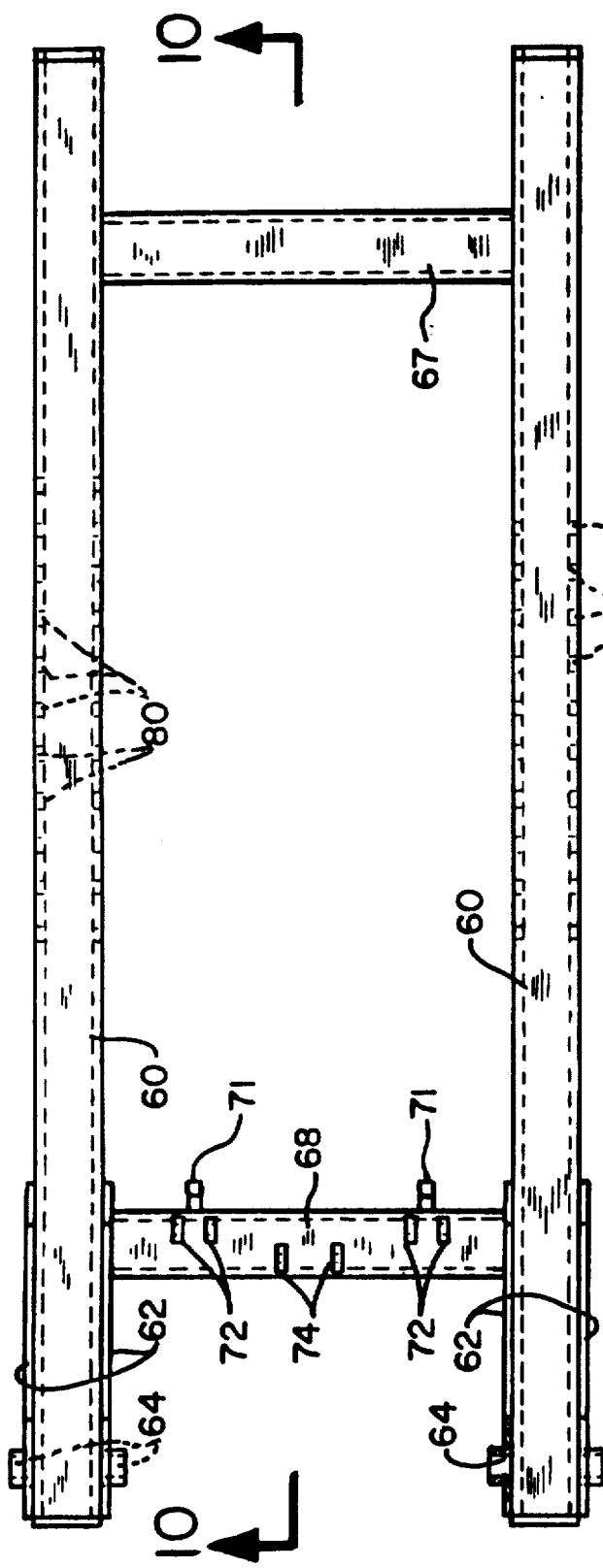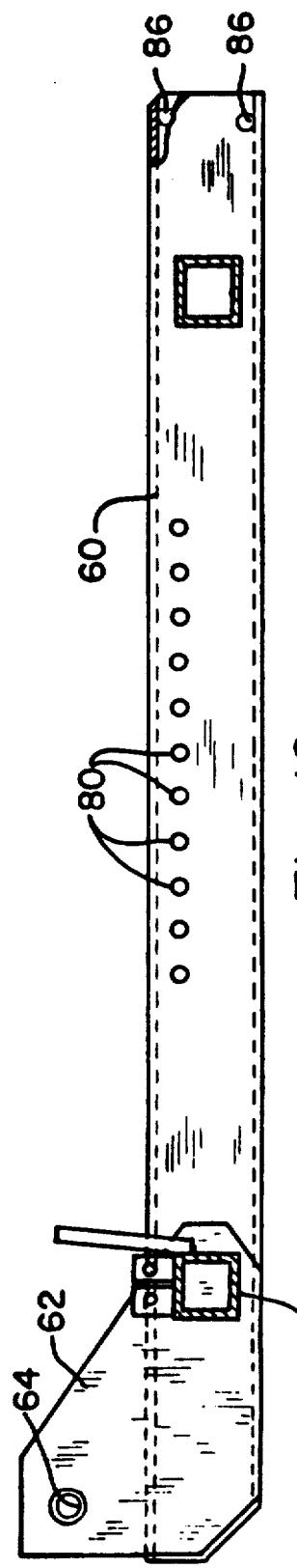

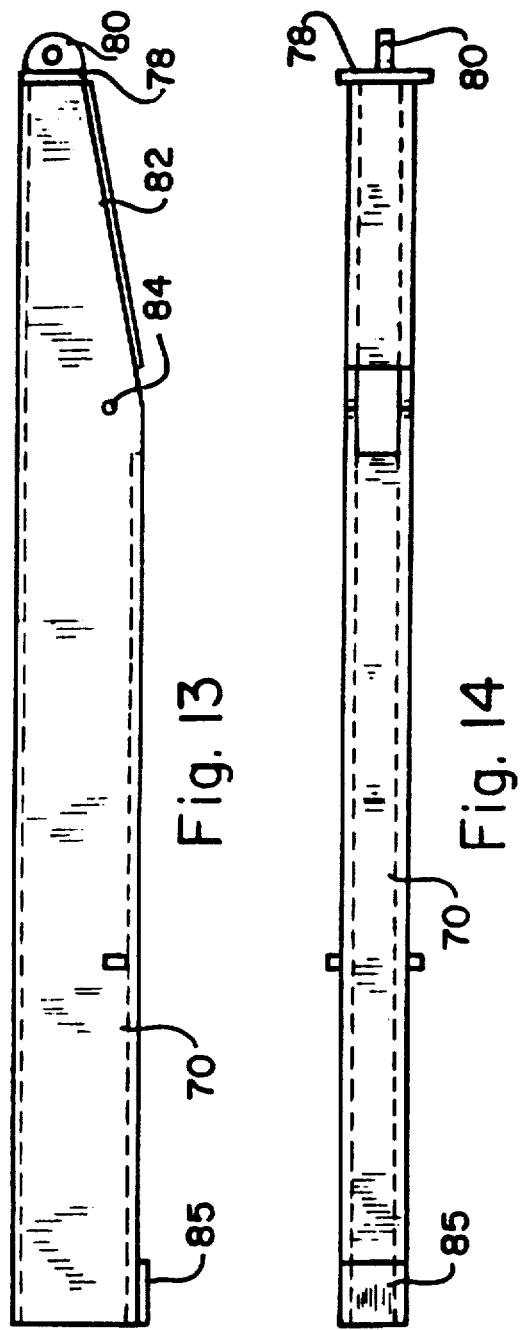

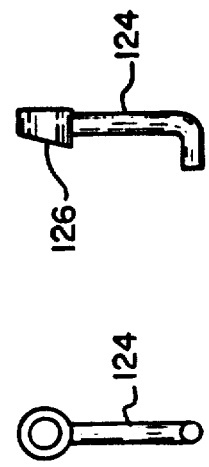
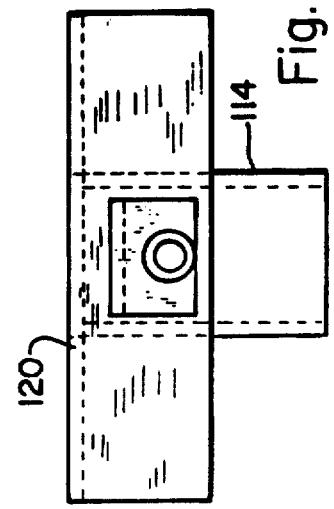
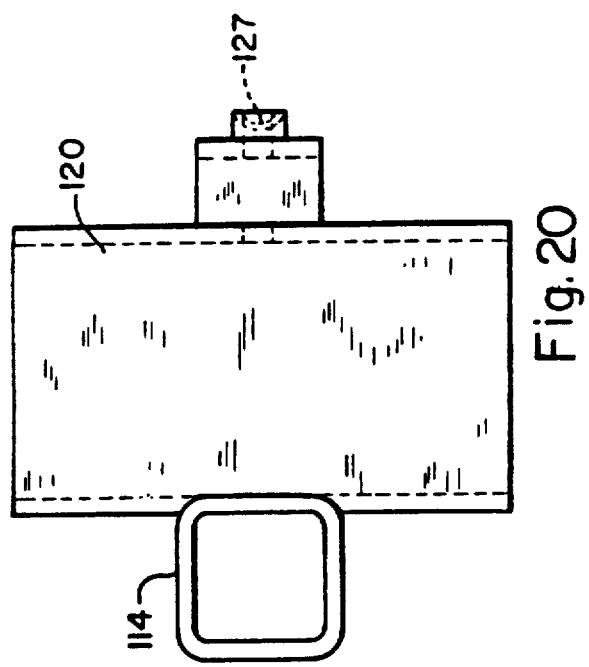
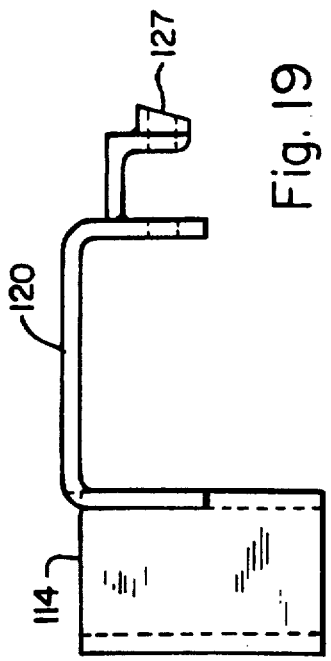

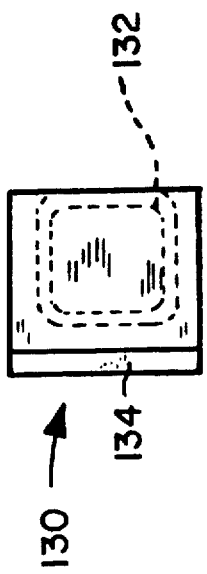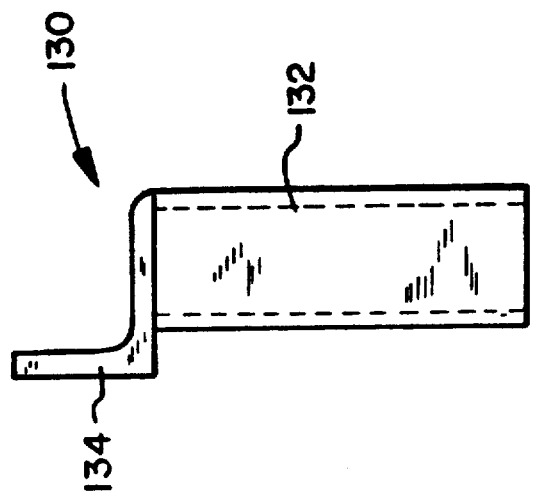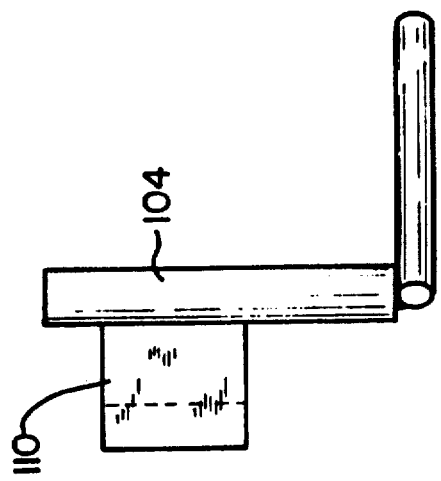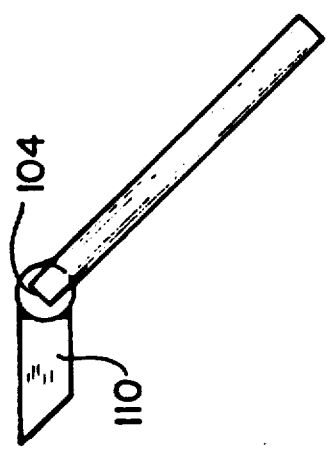

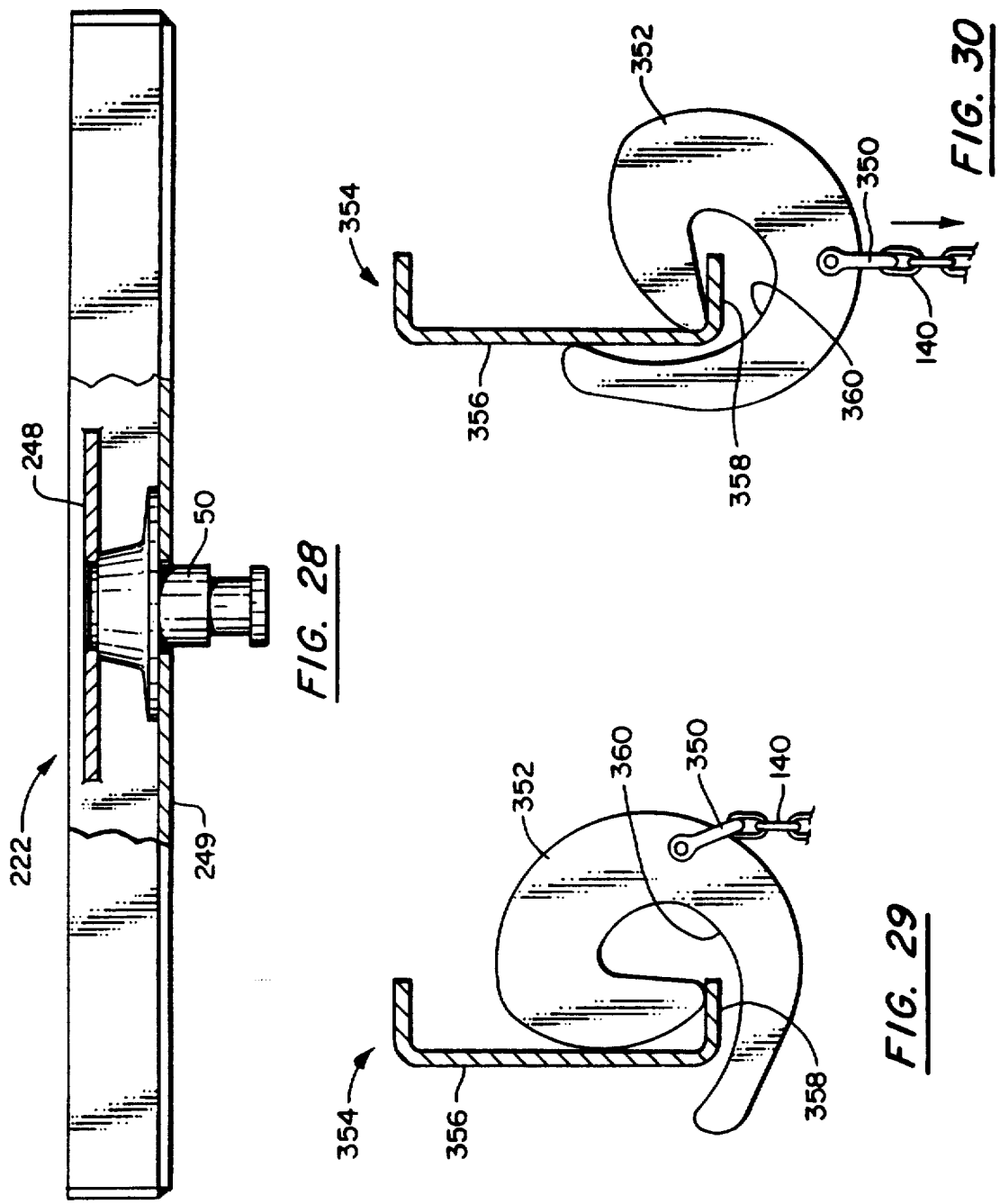

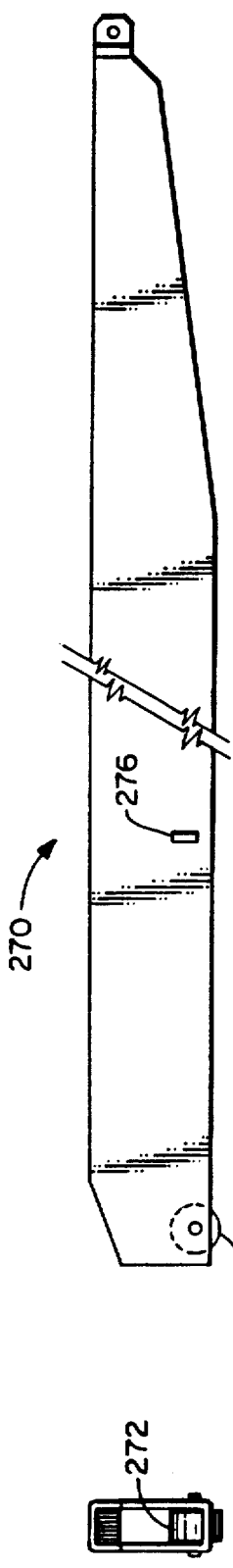
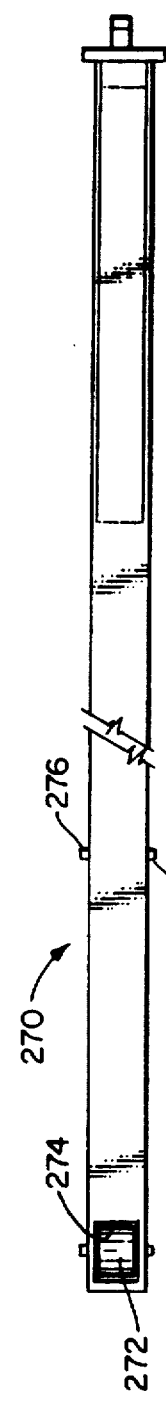
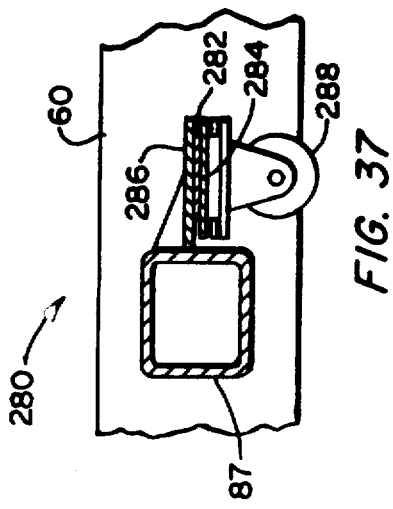
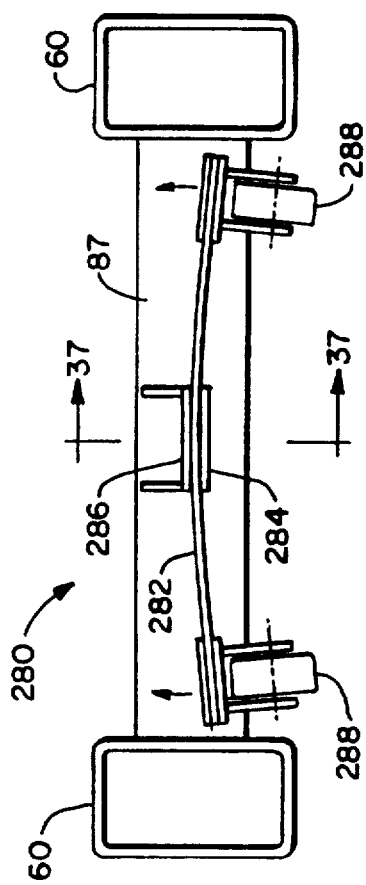

TRUCK TOWING BOOM

CROSS REFERENCE TO RELATED APPLICATION

This application is a continuation-in-part of U.S. application Ser. No. 07/670,248 filed on Mar. 15, 1991, now U.S. Pat. No. 5,163,803.

BACKGROUND OF THE INVENTION

This invention relates generally to devices which are employed for towing vehicles. More particularly, the present invention relates generally to devices which mount to the fifth wheel of a tractor and are adapted for towing a truck.

A number of boom assemblies are specifically adapted for attachment to a truck for purposes of towing a truck or other large vehicle. A number of such assemblies are specifically adapted for mounting to the fifth wheel of a tractor so that the tractor provides the motive power for towing the vehicle. Many of the prior art boom assemblies function to lift the front en of the truck at a relative position wherein a significant downward force is applied to the rear of the tractor during the towing process. The downward force tends to pivot the frame of the tractor about the rear axles. The front end of the tractor is consequently "lightened" or tends to lift. In extreme cases, safe operation of the towing vehicle is jeopardized due to the light front end.

Various devices to which the patent relates are disclosed in the following references which are identified below by patentee and U.S. Pat. No.:

| Patentee | U.S. Pat. No. |
|---|---|
| Krisa | 4,861,221 |
| Plant | 4,842,472 |
| Bilas | 4,797,058 |
| Morton | 4,555,214 |
| Hubert | 4,544,175 |
| Skala et al | 4,149,643 |
| Flaugh | 4,316,617 |
| Parkes | 4,047,733 |
| Mosling | 2,325,869 |

SUMMARY OF THE INVENTION

Briefly stated, the invention in a preferred form is a truck towing boom assembly which comprises a main frame including a pair of laterally spaced beams and a pair of spaced uprights extending generally perpendicularly to the beams. An assembly for attaching the assembly to the fifth wheel of the vehicle is mounted to the beams. A pair of lift legs are pivotally mounted at a lower portion of the uprights and are preferably configured in telescopic relationship. A pair of hydraulic cylinders connect between the main frame and the lift legs. The hydraulic cylinders function to pivot the legs at a folded position wherein the legs and uprights are substantially parallel, a second extended position wherein the legs essentially rest on the road for attachment to the truck when the main frame is mounted to a fifth wheel, and a third extended position wherein the angle between the main frame and the lift legs is greater than that of the second position. At the third pivot position, the legs are forced to an elevated position above the road when the legs are appropriately secured to the frame of the truck.

The leg assembly may have a collapsible wheel assembly to facilitate positioning. Telescopic leg extensions also mount rollers which engage the interior bottom surface of the tubular legs, and the extensions also slide along wear pads to facilitate positioning. A variably positionable receiver which may include a height adjustment mechanism is mountable to the underside of the front wheel portion of the truck for securing same to the support legs. A second securement assembly, which may include a chain and a specially configured hook, is mounted at the terminus of the telescopic leg extensions to secure a portion of the truck frame to the lift legs. A lock assembly, which may be a telescopic tubular structure, locks the legs and the main frame at the third pivot position during towing. A multi-position lock mechanism may be provided.

In a collapsable boom assembly embodiment, the upright structure is pivotal relative to the beam structure. A second set of hydraulic cylinders is employed to pivotally retract the upright structure, to an orientation generally parallel to the beam structure. The second set of hydraulic cylinders is subsequently activatable to slide the upright structure in a direction generally parallel to the beam structure to provide for a compact folded configuration.

The boom assembly also may corporate a positioning mechanism for selectively vertically positioning the upright structure relative to the beam structure to adjust for various vehicular and load constraints. The upright structure comprises a pair of uprights which mount guide members. A pair of plates is mounted to each of a pair of beams. The plates mount a pair of opposed slide blocks. The guide members may be generally T-shaped members which are captured by the plates and the opposed slide blocks. The vertical positions of the uprights are obtained by displacing the uprights and inserting a pin into aligned openings of the positioning plates and the guide members.

An object of the invention is to provide a new and improved truck towing boom assembly which is mountable to a fifth wheel of a tractor.

Another object of the invention is to provide a new and improved truck towing boom assembly which is adaptable for attachment to the frame of a vehicle in a relatively easy and efficient manner and is easily transformable to a towing mode.

A further object of the invention is to provide a new and improved truck towing boom assembly which mounts to a fifth wheel and attaches to the towed vehicle in a positional and force distribution relationship wherein the towed vehicle does not exert a substantial downward force tending to upwardly pivot the front of the tractor about the rear axles.

A yet further object of the invention is to provide a new and improved truck towing boom assembly which can be efficiently transported and/or stored in an efficient manner when the assembly is not being used.

Other objects and advantages of the invention will become apparent from the drawings and the specification.

BRIEF DESCRIPTION OF THE DRAWINGS

FIG. 1 is a side elevational view of a tractor and a truck towing boom assembly, wherein the boom assembly is illustrated in a non-towing mode;

FIG. 2 is a side elevational view of the tractor and boom assembly of FIG. 1, wherein the boom assembly is illustrated in a position for attachment to a truck;

FIG. 3 is a side elevational view of the truck and boom assembly of FIG. 1, further illustrating attachment of a truck to the boom assembly;

FIG. 4 is a side elevational view of the tractor, boom assembly and truck of FIG. 3, illustrating the boom assembly in the towing mode;

FIG. 6 is a sectional view of the boom assembly of FIG. 5, taken along the line 6—6 thereof;

FIG. 9 is a fragmentary top plan view, partly in phantom, of a leg assembly of the boom assembly of FIG. 5;

FIG. 10 is a sectional view, partly broken away and partly in phantom, of the leg assembly of FIG. 9, taken along the line 10—10 thereof;

FIG. 13 is a side elevational view, partly in phantom, of the leg assembly of the boom assembly of FIG. 6;

FIG. 14 is a bottom view, partly in phantom, of the leg assembly of FIG. 13.

FIG. 19 is an elevational view of a receiver employed with the boom assembly of FIG. 6;

FIG. 20 is a top plan view, partly in phantom, of the receiver of FIG. 19;

FIG. 21 is a side view, partly in phantom, of the receiver of FIG. 19, viewed from the right thereof;

FIG. 22 is a side view of a handle for the receiver of FIG. 19;

FIG. 23 is an end view, partly in phantom, of the handle of FIG. 22;

FIG. 24 is an enlarged top view of a lock lever employed in the lock sub-assembly of FIG. 8;

FIG. 25 is a side view of the lock lever of FIG. 24;

FIG. 26 is a top view, partly in phantom, of a receiver which may be employed in the boom assembly of FIG. 5;

FIG. 27 is a side view, partly in phantom, of the receiver of FIG. 26;

FIG. 28 is an enlarged fragmentary side view, partly in section and partly broken away, illustrating an alternative embodiment of the fifth wheel attachment assembly which may be employed in the boom assembly of FIG. 6;

FIG. 29 is an end elevational view of a portion of a chain and hook for the boom assembly of FIG. 6 and a sectional portion of the vehicle frame, said hook illustrated in a pre-locked relation to the vehicle frame;

FIG. 30 is an end view of the hook, chain and frame of FIG. 29, said hook illustrated in locked position to the vehicle frame;

FIG. 33 is a side elevational view, partly in phantom and partly broken away, illustrating an alternate embodiment of a leg extension for the boom assembly of FIG. 6;

FIG. 34 is a bottom view of the leg extension of FIG. 33;

FIG. 35 is a sectional view of the leg extension of FIG. 33, taken along the line 35—35 thereof;

FIG. 36 is an end view, portions being removed, of an alternate embodiment of the leg assembly of the boom assembly of FIG. 6 viewed from the right end thereof;

FIG. 37 is a fragmentary sectional view of the leg assembly of FIG. 36, taken along the line 37—37 thereof;

DETAILED DESCRIPTION OF THE PREFERRED EMBODIMENTS

Figure 5:
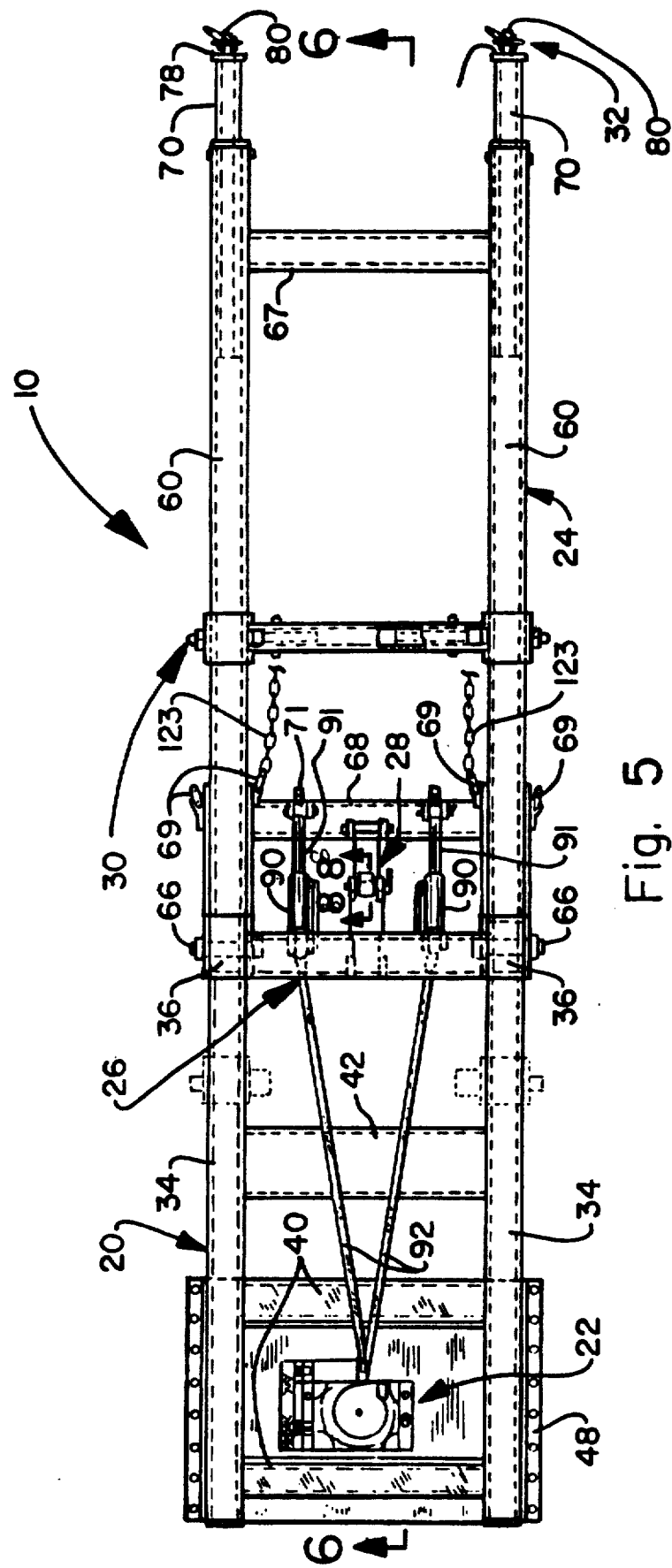
FIG. 5 is a top plan view of the boom assembly of FIG. 2.
Figure 8:
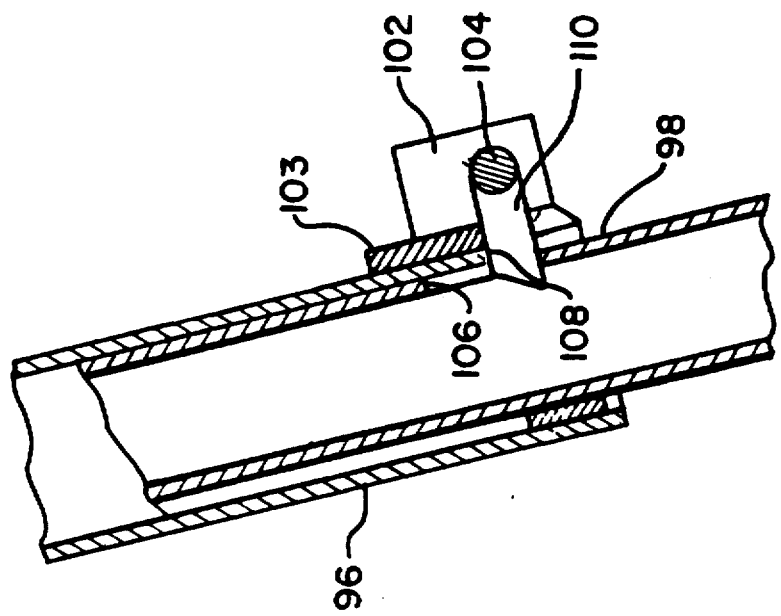
FIG. 8 is an enlarged fragmentary sectional view of a lock sub-assembly for the boom assembly of FIG. 5, taken along the line 8—8 thereof.

With reference to the drawings wherein like numerals represent like parts throughout the several figures, a truck towing boom assembly in accordance with the present invention is generally designated by the numeral 10. The boom assembly is adapted to mount to a fifth wheel 12 of a tractor 14 for towing a disabled truck 16. The boom assembly 10 has application in connection with towing trucks of various sizes and configurations as well as other vehicles.

The boom assembly 10 is mountable to the fifth wheel 12 when required and may be easily dismounted for storage purposes. The mounted boom assembly 10 is foldable to a non-towing transportation mode illustrated in FIG. 1. When the tractor 14 and mounted boom assembly 10 arrive at the location of the vehicle which is to be towed, the boom assembly is extended to the position of FIG. 2 wherein the lower portion of the boom assembly rests on the road or ground and is positioned at the underside of the frame of the truck 16. The truck is then secured to the boom assembly as illustrated in FIG. 3. The boom assembly is then transformed to the towing configuration illustrated in FIG. 4 wherein the boom assembly is elevated from the road or ground, and the truck is in condition for towing by the tractor.

With additional reference to FIGS. 5 and 6, the boom assembly 10 generally comprises a main frame 20 which carries a fifth wheel attachment assembly 22. The attachment assembly 22 mounts to the fifth wheel 12 of the tractor in a conventional fashion. A lift leg assembly 24 is pivotally mounted to the lower portion of the main frame. The pivotal position of the leg assembly 24 relative to the main frame 20 is controlled by a hydraulic unit 26 and a cooperative lock sub-assembly 28. A removable and variably positionable receiver 30 is mounted to the leg assembly for engaging the underside front portion of the truck. A second securement assembly 3 attaches to the truck frame rearwardly of the vehicle cab from a rear terminal portion of the leg assembly.

Figure 12:
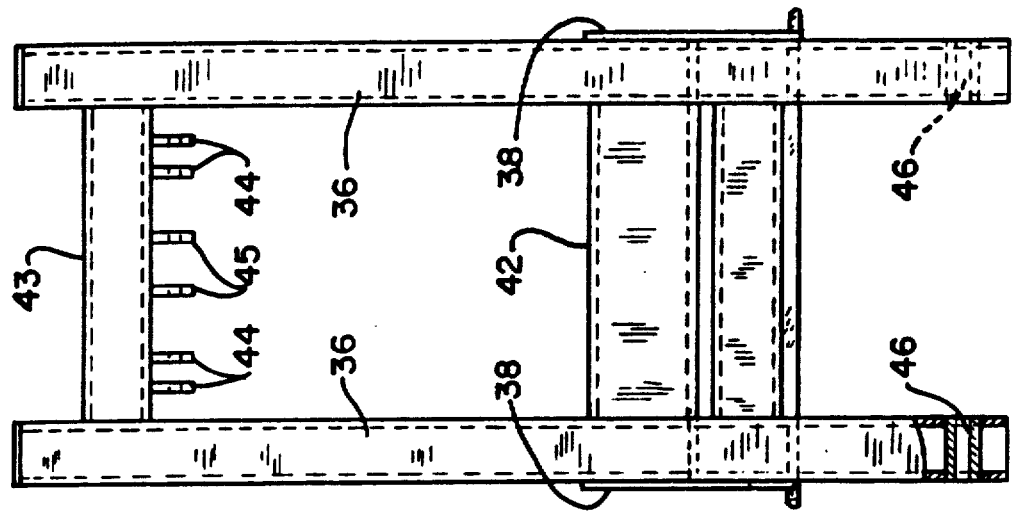
FIG. 12 is a front elevational view, partly in phantom and partly broken away, of the main frame assembly of FIG. 11, viewed from the right thereof.
Figure 11:
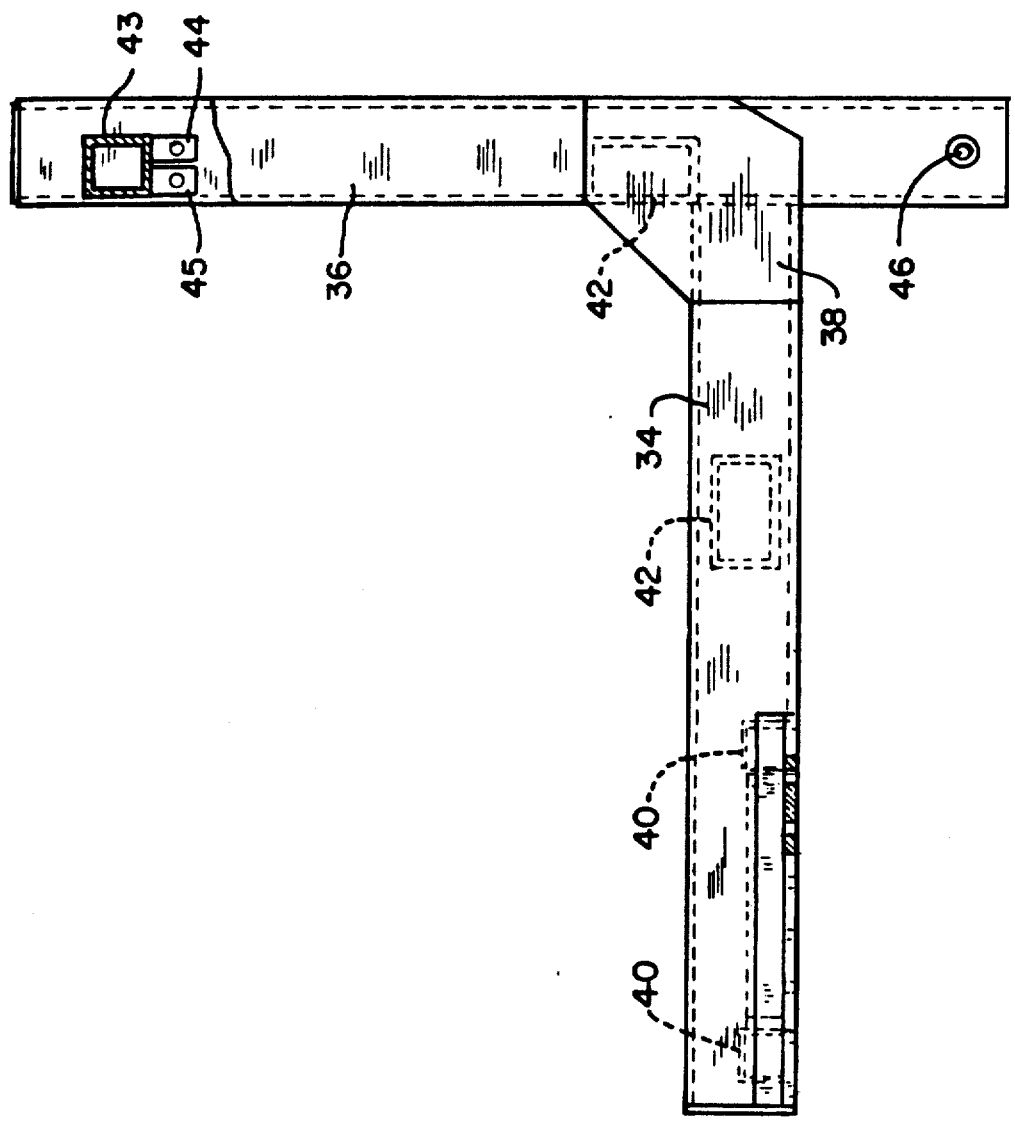
FIG. 11 is a side elevational view, partly in phantom, partly broken away and partly in section, of the frame assembly of the boom assembly of FIG. 6.
Figure 16:
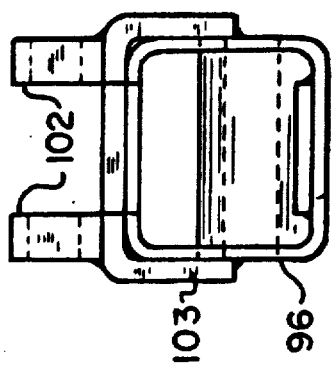
FIG. 16 is an end view, partly in phantom, of the lock sub-assembly portion of FIG. 15 viewed from the right end thereof.
Figure 15:
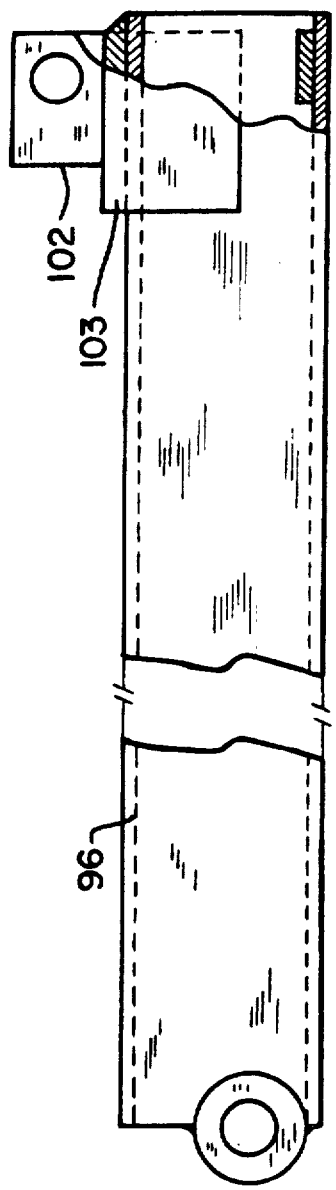
FIG. 15 is an enlarged side view, partly in phantom, partly broken and partly in section, of a portion of the lock sub-assembly of FIG. 8.
Figure 17:
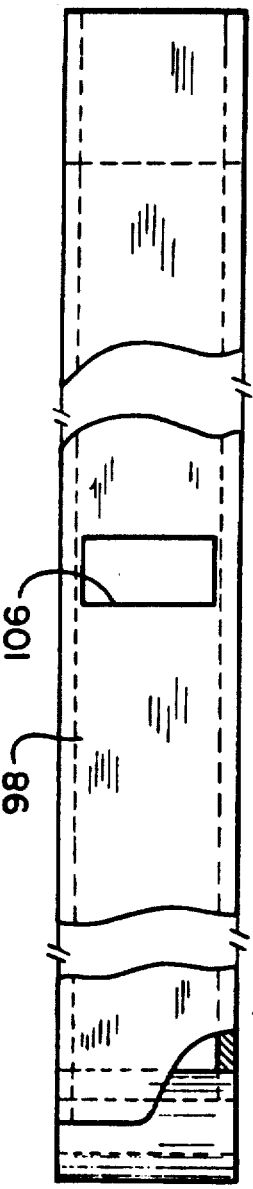
FIG. 17 is a generally frontal view, partly in phantom, partly broken away and partly in section, of a second portion of the lock sub-assembly of FIG. 8.
Figure 18:
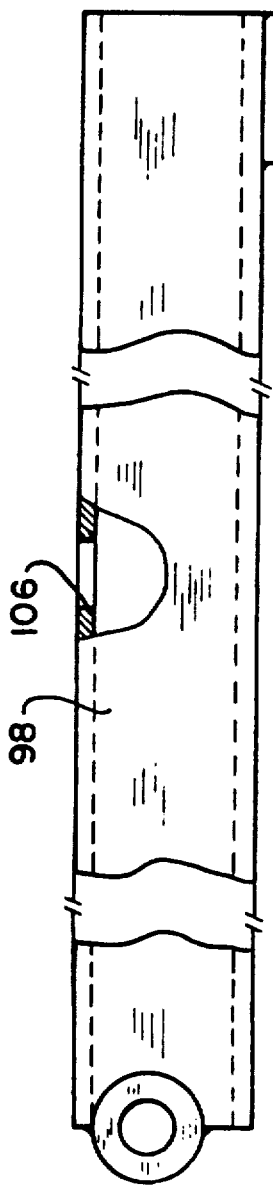
FIG. 18 is a side elevational view, partly in phantom, partly broken away and partly in section, of the lock sub-assembly portion of FIG. 17.

The main frame 20 comprises a pair of laterally spaced beams 34 which connect at one end with a pair of uprights 36 at an intermediate location of the uprights. The uprights and beams are fixedly disposed in perpendicular relationship. With additional reference to FIGS. 11 and 12, polygonal-shaped joining plates 38 are welded to the beams and the uprights for joining the members. Laterally extending cross beams 40 and 42 extend between the beams and the uprights to lend stability to the main frame. The beams, uprights and cross beams are preferably heavy duty tubular steel members. A cross beam 43 is also mounted at an upper location of the uprights. Laterally spaced pairs of connecting ears 44 having aligned openings and an intermediate pair of connecting ears 45 having aligned openings disposed between the outer pair of ears extend downwardly from the cross beam 43. An opening 46 is formed in the lower portion of the uprights to implement the pivotal connection with the leg assembly 24.

The fifth wheel attachment assembly 22 is mounted to the main frame between beams 34 and cross beams 40 toward the front of the main frame. The fifth wheel attachment assembly comprises a plate 48 which is bolted to the underside of the beams 34. A block 49 mounting a kingpin 50 for coupling with the fifth wheel is mounted to the plate. The kingpin 50 which has a conventional form projects from the underside of the plate 48 and couples with the fifth wheel 12 in a conventional manner.

An alternate embodiment of the fifth wheel attachment assembly 222 illustrated in FIG. 28 is mounted below the main frame and attached at the underside of beams 34 and cross beams 40. Attachment assembly 222 is configured to provide additional ground clearance for the boom assembly. The kingpin 50 is mounted between a pair of vertically spaced plates 248 and 249 of a flat, reinforced box-like riser assembly.

With additional reference to FIGS. 9 and 10, the lift leg assembly 24 comprises a pair of steel tubular legs 60. A pair of wing plates 62 are mounted at a frontal portion to each of the legs. The wing plates 62 project upwardly from the legs 60 to form a pair of laterally spaced yokes. An aperture 64 in each of the wing plates is alignable with the openings 46 of the uprights. A pivot pin 66 is secured in the aligned apertures 64 and openings 46 for pivotally connecting the leg assembly with the main frame. The wing plates 62 and the resulting offset location of the pivotal connection allow the lift leg assembly 24 to gain ground clearance upon the boom assembly being transformed to the retracted configuration of FIG. 1 or the extended configuration of FIG. 4.

A cross beam 68 connects between inner sides of the legs. Pairs of ears 72,74 are welded to the upper surface of the cross beam and project upwardly in general lateral alignment with the ears 45, 44. Anchor rings 69 for anchoring chains are rigidly mounted at opposing sides of each of the legs at positions adjacent the ends of cross beam 68.

With additional reference to FIGS. 13 and 14, a telescopic extension 70 is slidably received by each leg through the rear end thereof. Each extension 70 is linearly positionable to extend the effective length of the assembly in accordance with the dimensional constraints of the vehicle to be towed. The rear portion of the extension is upwardly tapered. A plate 78 is welded across the rear end of the extension. An anchoring ring 80 is welded to the plate. A second plate 82 is also welded at the rear underside of the extension. A stop pin 84 projects from the extension side and interferes with the end of the leg to limit the inward telescopic position of the extension. A pair of centering bars 86 are disposed at an inner rear end location of the leg for centering the extension. A steel strip 85 welded at the front underside of the extension interferes with the lower centering bar 86 to retain the extension 70 with the receiving leg 60. A cross member 67 extends at a rear position between the legs to enhance the structural integrity of the leg assembly. A linear row of openings 88 is formed along the sides of the legs for anchoring the receiver 30, as will be detailed below.

With reference to FIGS. 32-35, an alternate embodiment of a leg extension 270 includes a rear roller or wheel 272. The roller is mounted between opposing sides of the tubular extension member and partially extends at the bottom through a rectangular rear opening 274 in the bottom panel of the extension, as best illustrated in FIG. 34. The roller 272 supports the inward end of the extension and slides along the inside of the tubular receiving leg 60 to facilitate positioning (retraction and extension) of the extension. Transversely projecting stops 276 interfere with the end of the receiving leg 6 to limit the telescopic retraction of the extension 270 into the leg 60. A wear plate 278 (FIG. 32) is mounted proximate the forward lower interior portion of the receiving leg. The wear plate 278 supports and slidably engages the lower panel of the extension 270 to further facilitate the positioning of the extension.

With additional reference to FIGS. 36 and 37, a collapsable wheel sub-assembly 280 may also be mounted to the leg assembly cross-bar 67. The collapsable wheel assembly 280 includes a leaf spring 282 which is bolted between a retainer plate 284 and the underside of a mounting plate 286 rigidly anchored to the rear panel of the cross-bar 87. Caster wheels 288 are mounted at opposing ends of the leaf spring. The caster wheels 288 function to facilitate the positioning of the leg assembly. When the downward force exerted on the boom assembly becomes excessive, for example, upon loading the towed vehicle, the caster wheels 288 essentially deflect upwardly (in the direction of the FIG. 36 arrows) against the bias of the leaf spring 282 to prevent the wheels from being crushed.

The hydraulic unit 26 comprises a pair of hydraulic cylinders 90 which are pivotally mounted to ears 44 for pivoting about a horizontal transverse axis. A reciprocating piston drives a rod 91 which is pivotally mounted to ears 72 for pivoting about a second horizontal transverse axis. A suitable hydraulic cylinder 90 is a Prince hydraulic cylinder having a four inch bore and a forty-eight inch stroke. Naturally, other hydraulic cylinders may be suitable. Hydraulic lines 92 connecting the cylinders may connect with the hydraulic lines of the tractor. The hydraulic cylinders 90 function to retract and extend the leg assembly to thereby define the angle between the main frame, i.e. uprights 36, and the legs 60 which are positionable under the vehicle to be towed. In particular, the cylinders 90 are actuatable to expand the boom assembly from the folded non-towing mode of FIG. 1 to the attachment configuration of FIGS. 2 and 3 and to the extended towing configuration of FIG. 4. It will be appreciated that the extended towing configuration is obtained by using the hydraulic forces to expel the piston rod 91 to an extended position. A pair of vertical bumper strips 71 may be welded to beam 68 and project upwardly at the rear of the rods 91 to protect the cylinders and rods from impact by the towed vehicle.

The lock sub-assembly 28 functions to lock the boom assembly in the extend towing position of FIG. 4 in a quasi-self-locking fashion. With reference to FIG. 8 and FIGS. 15-18, the lock sub-assembly includes an outer tube 96 and an inner telescopic tube 98. The tubes 96, 98 preferably have a square section. The extreme ends of the tubes 96 and 98 have transverse openings or sleeves for receiving pins or bolts to pivotally connect the tubes to respective ears 45 and 74. A pair of ears 102 project from a U-shaped bracket 103 which is welded to the outer tube 96 for mounting a latch lever 104 (FIGS. 24 and 25). The inner tube has a rectangular slot 106 which is dimensioned and positioned with respect to a lower end recess 108 of the outer tube so that a wedge-shaped latch 110 essentially drops through into the slot 106 and is captured against the end recess 108 to lock the telescopic tube assembly at the extended lock position during towing. The latch lever may be manually rotated to withdraw the latch 110 from the slot to release the lock.

Figure 38:
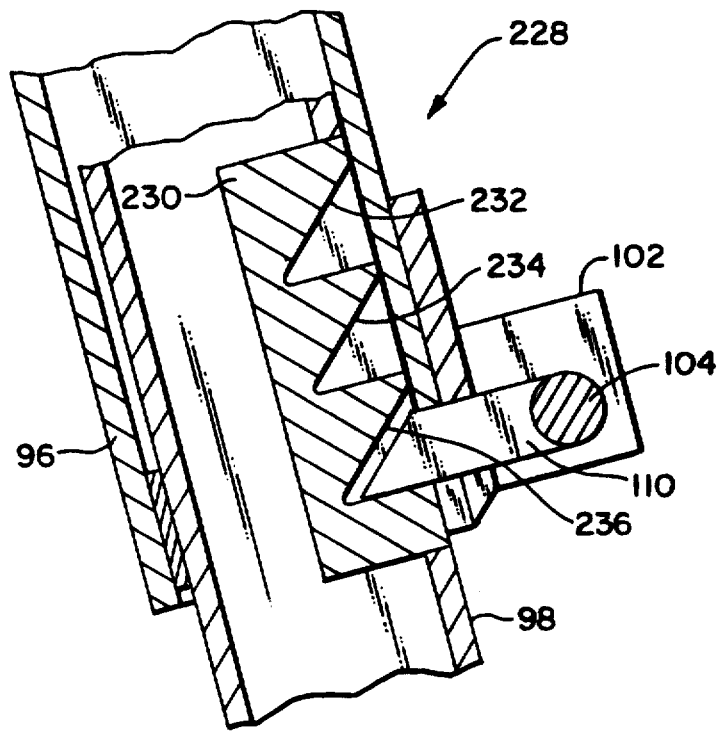
FIG. 38 is an enlarged fragmentary sectional view of an alternate embodiment of the lock sub-assembly of FIG. 8.
Figure 39:
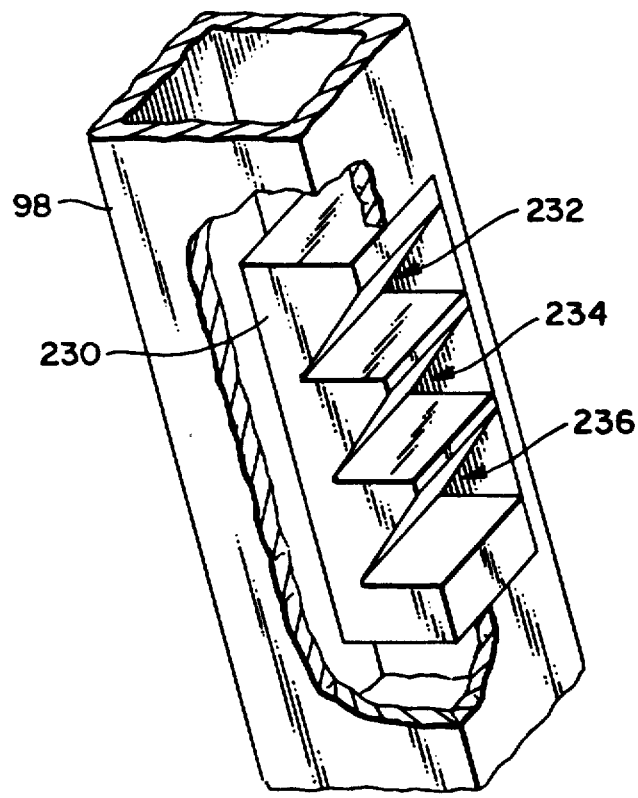
FIG. 39 is a fragmentary perspective view, partly broken away, illustrating the lock sub-assembly of FIG. 38.

With reference to FIGS. 38 and 39, an alternate embodiment of the lock sub-assembly 228 includes a block 230 which defines three slots 232, 234 and 236 for the latch 110 as opposed to the single slot 106 of lock sub-assembly 28. Naturally, other numbers of slots may be provided. The multi-slot configuration enhances the manufacturing and wear tolerances for the lock sub-assembly so that the tubes 96,98 may be locked at a more optimum position once the vehicle is secured in position, and depending in part also upon characteristics of the vehicle to be towed and the preferred boom leg assembly angular position.

Prior to towing the vehicle, the leg assembly 24 is positioned beneath the front end of the vehicle. The receiver 30 engages under the front wheels and/or I-beam of the vehicle. The rear securement assembly 32 secures the vehicle frame at the rear end of the leg assembly. The vehicle is thus preferably secured to the leg assembly 24 at two longitudinally spaced pairs of laterally opposed positions. Two longitudinally spaced securements are illustrated in FIGS. 3 and 4.

Figure 7:
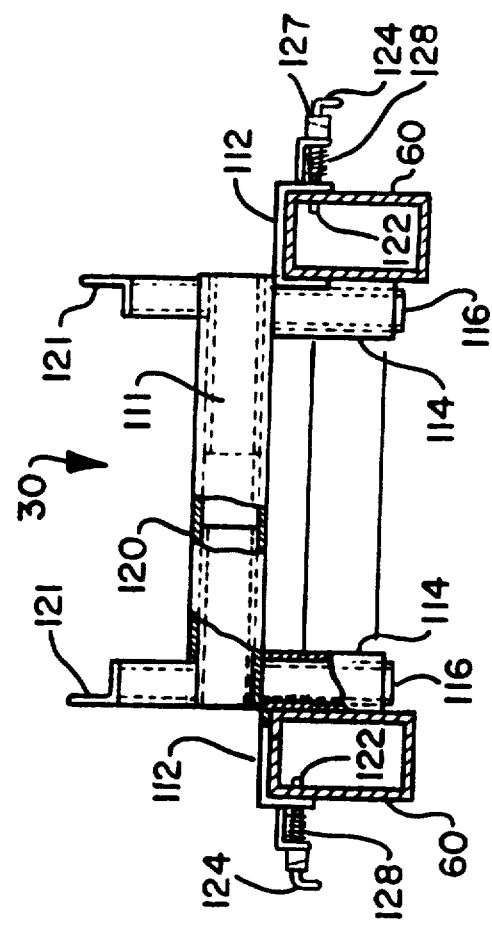
FIG. 7 is a sectional view of the boom assembly of FIG. 6, taken along the line 7—7 thereof.

The receiver 30 may assume a wide variety of shapes, dimensions and configurations in accordance with the specific vehicle to be towed. With reference to FIG. 7, receiver 30 is adapted to engage the underside of the vehicle leaf spring (not illustrated) and laterally retain the leaf spring. Receiver 30 is especially adapted for vehicles having a front drive axle. The receiver is positioned and secured to the legs 60 by a laterally adjustable bracket 111, which is configured for retention by laterally opposed bases 112 (FIGS. 19-23). The bases 112 are dimensioned and positionable to slide along the upper portion of the legs 60. A rectangular tube 114 at the inside of the base forms a vertical socket for receiving a locating foot 116 of the bracket 111. The bracket has a laterally variably positionable telescopic cross support 120. A support strut projects upwardly from the cross support 120 and includes opposed inverted L-shaped retaining catches 121 which engage the underside of the vehicle leaf spring and also the side of the leaf spring to retain the front portion of the vehicle in proper position to the leg assembly. The support is adjustable to accommodate a wide range of vehicle configurations. A chain 123 (partially illustrated in FIG. 5) attached to a ring 69 is then wrapped around the leaf spring or other structure at the underside of the vehicle in the vicinity of the front wheel and tightened for retaining the front wheel portion of the vehicle to the receiver.

The position of each base 112 is fixed by a lock pin 122 which is dimensioned and alignable for insertion into a selected opening 88 of the leg. An outer handle 124 (FIGS. 22 and 23) is angularly rotatable for engaging between a movable cam surface 126 and a fixed cam surface arrangement 127 for withdrawing the pin against the loaded bias of a spring 128 urging the lock pin 122 inwardly, to thereby release the pin for positioning the receiver.

Alternately, as illustrated in FIGS. 26 and 27, the receiver 130 may take the form of a foot 132 which is inserted into the socket 114. An L-shaped flange 134 mounted at the top of the foot engages the front side of the front wheel I-beam. The chain 123 is then secured around the I-beam and tightened to forwardly engage the I-beam against the flange for securing the front portion of the wheel to the I-beam.

Figure 31:
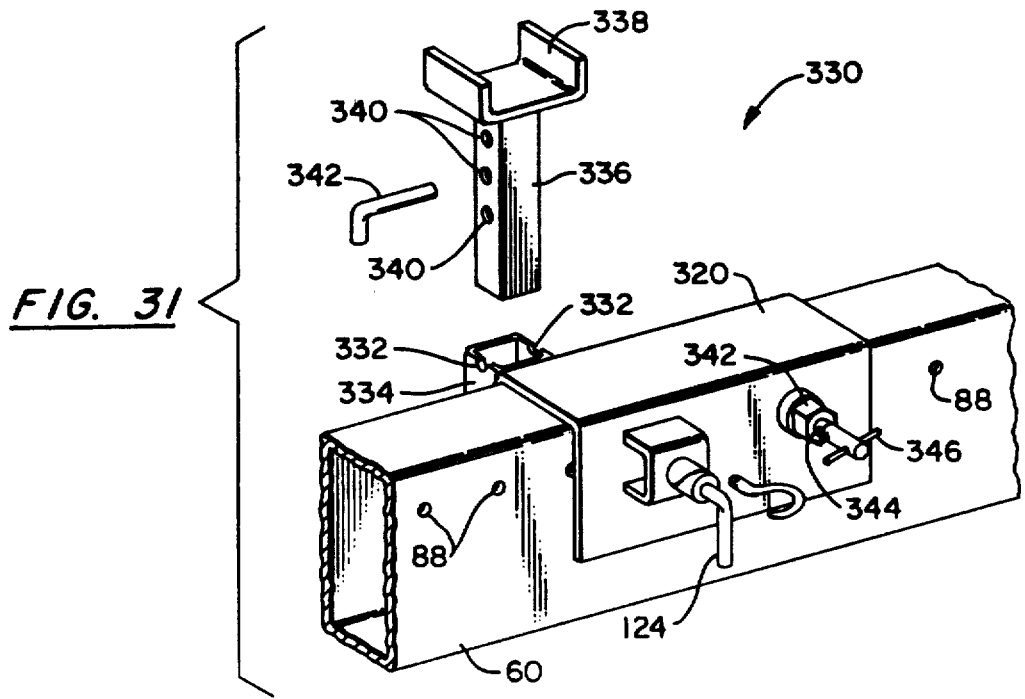
FIG. 31 is an exploded perspective view of an alternate embodiment of a receiver illustrated in conjunction with a portion of a leg assembly of the boom assembly of FIG. 6.
Figure 32:
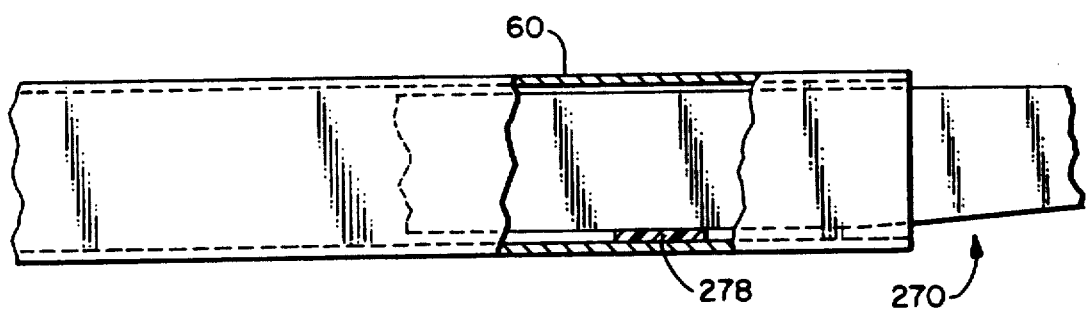
FIG. 32 is a fragmentary side view, partly broken away and partly in section, illustrating an alternate embodiment of the leg assembly and extension for the boom assembly of FIG. 6.

Another embodiment of a receiver sub-assembly 330 is illustrated in FIG. 31. The rectangular tubular socket 334, which is mounted to a base 320 similar to base 120, includes a pair of opposed upper notches 332. A support foot 336, which mounts an upper U-shaped catch 338 for engaging the front wheel I-beam or other vehicle support structure, is received in the socket. The foot has a series of vertically spaced apertures 340 extending from one side of the foot to the opposite side. An L-shaped pin 342 is insertable through a selected vertically spaced aperture 340 of the foot and is retainably cradled by the notches 332 so that the foot and hence the catch 338 is elevated at the desired vertical position for a given vehicle. A nut 342 is welded to the side of the base 320. A stud 344 threads to the nut and is torquable by a handle 346 for engagement or disengagement from an opening 88. The stud 344 and the lock pin 122 are aligned and spaced so that the receiver base may be secured to the leg by the lock pin 122 and stud 344 each engaging a selected opening 88. The longitudinal position of the receiver is thus securely anchored thru two independent lock members.

The rear securement sub-assembly 32 comprises a chain 140 which attaches to each of the rings 80. Each chain 140 preferably wraps around the top of the vehicle frame behind the cab and is tightened to secure the vehicle frame to the extension portion of the leg. No pinning or other mechanism is required to fix the position of the extension relative to the receiving leg 60. Alternately, a single chain may wrap across the top of the vehicle frame and be tightened through each of the rings 80. With reference to FIGS. 29 and 30, a clovis 350 may connect at the end of chain 130 to pivotally mount a frame hook 352. The frame hook 352 is especially configured to lock against the vehicle frame 354 which includes a medial support 356 and a lower flange 358. The hook 352 has a contoured curvical configuration which may be described as a script C-shaped form having an interior curved access slot 360. The access slot 360 allows for the hook to be passed laterally so that the lower frame flange 358 is received in the slot as illustrated in FIG. 29. The frame hook 352 is then pivoted downwardly (through a downward force exerted through chain 140) to lock against the frame wherein cooperating hook contact surfaces 362 and 364 engage respective top portions of the lower frame flange 358 and the back surface of the medial support 356 frame as illustrated in FIG. 30. A downward force exerted through chain 140 in the direction of the FIG. 30 arrow results in a corresponding downward force against the lower flange 358 through surface 362. The latter engagement is maintained by the engagement between surface 364 and the medial support which prevents the hook from further pivoting. The hook may be relatively easily dismounted upwardly by releasing the chain.

Various receivers schematically designated as numeral 148 which are designed for specific vehicle constraints may be provided to provide an appropriate range of structures for effectively securing the front wheel portion of the vehicle to the leg assembly. Such receivers 148 may be secured to the beams of the main frame, such as illustrated in FIG. 6. When the boom is retracted to the non-towing configuration of FIG. 1, the receiver 30 is mounted to beams 34.

With reference to FIGS. 1-4, the boom assembly 10 operates in a very efficient manner. In the folded non-towing mode of FIG. 1, a blocking 150 mounted between the beams 34 and the rear frame of the tractor is required to support the boom assembly. The blocking 150 is removed during the towing operations. The mounted boom assembly is transported to the location of the vehicle to be towed. The hydraulic unit 26 is actuated to extend the leg assembly so that the legs essentially rest on the roadway or pavement forwardly and adjacent to the front end of the vehicle. The leg assembly 24 is then positioned under the frame of the vehicle as best illustrated in FIG. 3. The vehicle essentially is secured to the leg assembly at two laterally opposed longitudinal positions, i.e., four discrete positions—two by means of chains 123 at the receiver 30 and two at the rear securement means 32 by means of chains 140. Frame hooks 352 may also be employed to secure the frame. The vehicle attachment locations are adjacent the front wheel and behind the vehicle cab at the top of the frame. Although four attachment points are desired, the boom assembly would effectively operate with only a front and rear attachment of the vehicle to the leg assembly.

After the attachment has been completed, the cylinders 90 are then actuated to force the piston rods 91 to an extreme extended position illustrated in FIG. 4. The engagement of the vehicle to the leg assembly forces the boom assembly to an elevated position so that the legs 60 are essentially forced to lift from the roadway with the front end of the vehicle. The vehicle is towed via the rear wheels but there is a significant force distribution relationship between the towed vehicle, the boom assembly and the tractor. The distribution of the downward force exerted through the front end of the vehicle is such that an insubstantial force acts downwardly at the rear of the tractor to pivot the tractor frame about the rear tractor wheels. Thus, the front end of the tractor does not tend to forcibly lighten or be forced upwardly as is common in numerous other booms. The vehicle is then towed in a trailer-type fashion which is somewhat akin to having all of the towed vehicle wheels on the pavement. The pivot range allowed by the fifth wheel, provides a limited pivoting point wherein the vehicle may be towed in an efficient and safe manner, regardless of the quality of pavement.

When the extreme extended position of the boom assembly is attained, i.e., the FIG. 4 towing configuration, the lock sub-assembly automatically falls into a locked configuration wherein the latch 110 drops into the slot 106. The hydraulic forces on the cylinders 90 may be released during the towing process so that extreme forces are not exerted on the hydraulic cylinders, and in particular the heads, during the towing. It will be appreciated that the extensions 70 of the leg assembly do not require any pinning or position fixing mechanism as such. The transformation to the extreme pivot position actually results in a lifting of the boom assembly due to the multiple attachment points to gain ground clearance for travel during the towing. Moreover, the hydraulic cylinders are used in an efficient and optional manner which does not result in excessive pressures being exerted on the hydraulic heads.

With reference to FIGS. 40-48, a collapsable boom assembly embodiment is generally designated by the numeral 510. Boom assembly 510 is sequentially collapsable or foldable from the extended towing configuration of FIG. 44 to the fully collapsed configuration of FIG. 47 so that the boom assembly may be efficiently transported. Boom assembly 510 may be stored in the relatively compact configuration of FIG. 48. In one preferred embodiment, the boom assembly 510 is collapsed to a compact configuration having a dimension of approximately 4 feet by 4 feet by 12 feet. Multiple boom assemblies 510 may be efficiently stacked. Boom assembly 510 also incorporates a mechanism for adjusting the vertical position of the leg assembly.

Figures 40, 41:
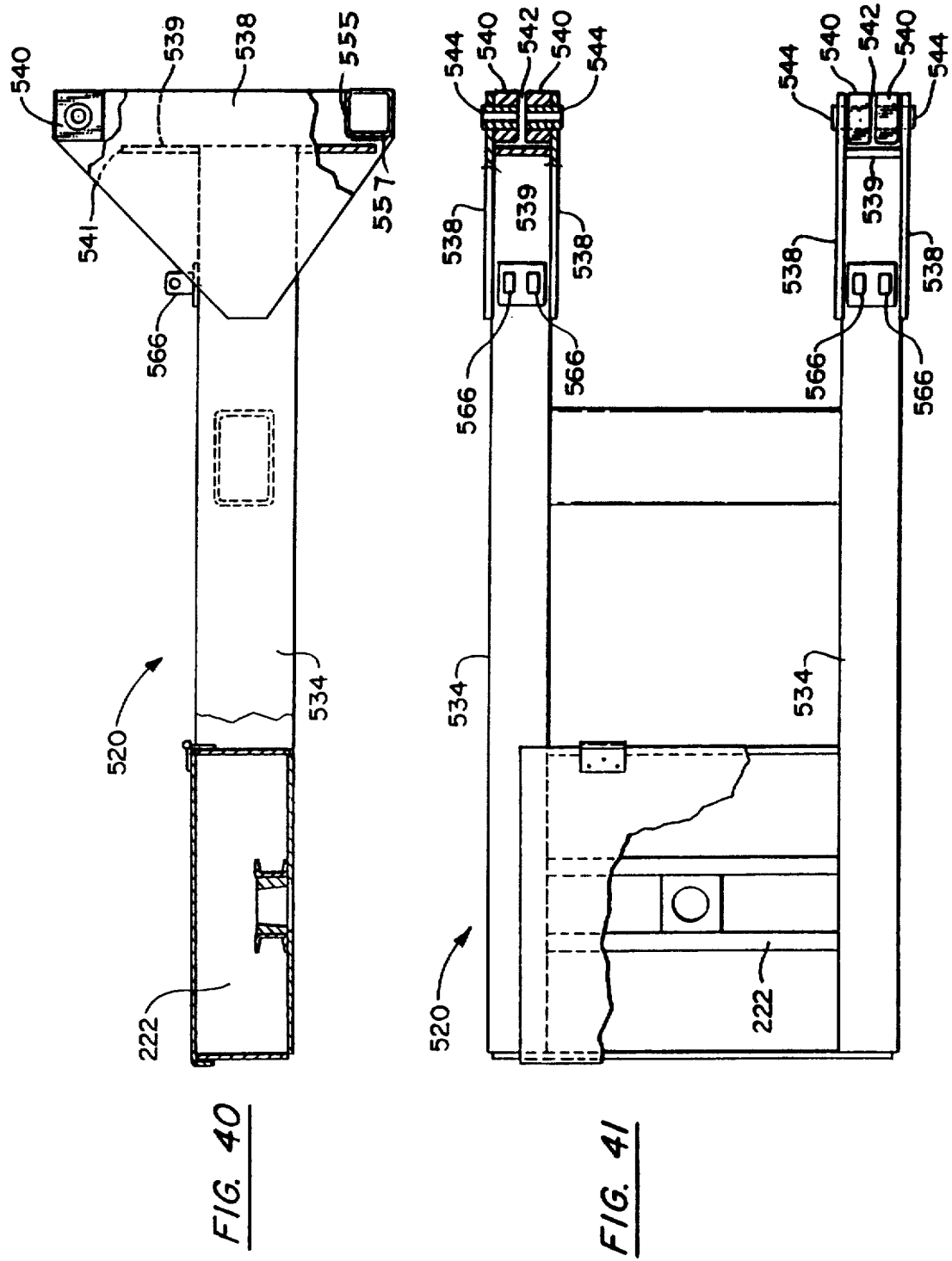
FIG. 40 is a fragmentary side elevational view, partly broken away, partly in section and partly in phantom, of a collapsable towing boom assembly embodiment.
FIG. 41 is a top plan view, partly broken away, partly in phantom, and partly in section of the collapsable towing boom assembly embodiment of FIG. 40.

With reference to FIGS. 40 and 41, the mainframe 520 includes a pair of beams 534 which mount the fifth wheel assembly to 222. A pair of polygonal guide plates 538 are welded at the outer end of each of the beams 534. The plates 538 provide guide channels as described below. A pair of opposed pivotal slide blocks 540, are mounted at an inward upper portion of the channel formed by each pair of the joining plates 538. The slide blocks 540 are mounted on spindles. Alternately, rollers may be employed instead of the slide blocks 540. Coaxial openings 544 are formed through the pairs of plates 538 and the spindles. Opposing fixed keepers 555 are mounted below the slide blocks 540. The keepers 555 mount polyethylene wear pads 557. In addition, a lateral guide plate 539 is welded to extend between each pair of the joining plates so that vertically spaced, tandem guide channels 542 having a T-shaped section are formed at the end of each of the beams, as best illustrated in FIG. 41. Chainholders 549 may also be mounted to the uprights 36.

Figures 42, 43:
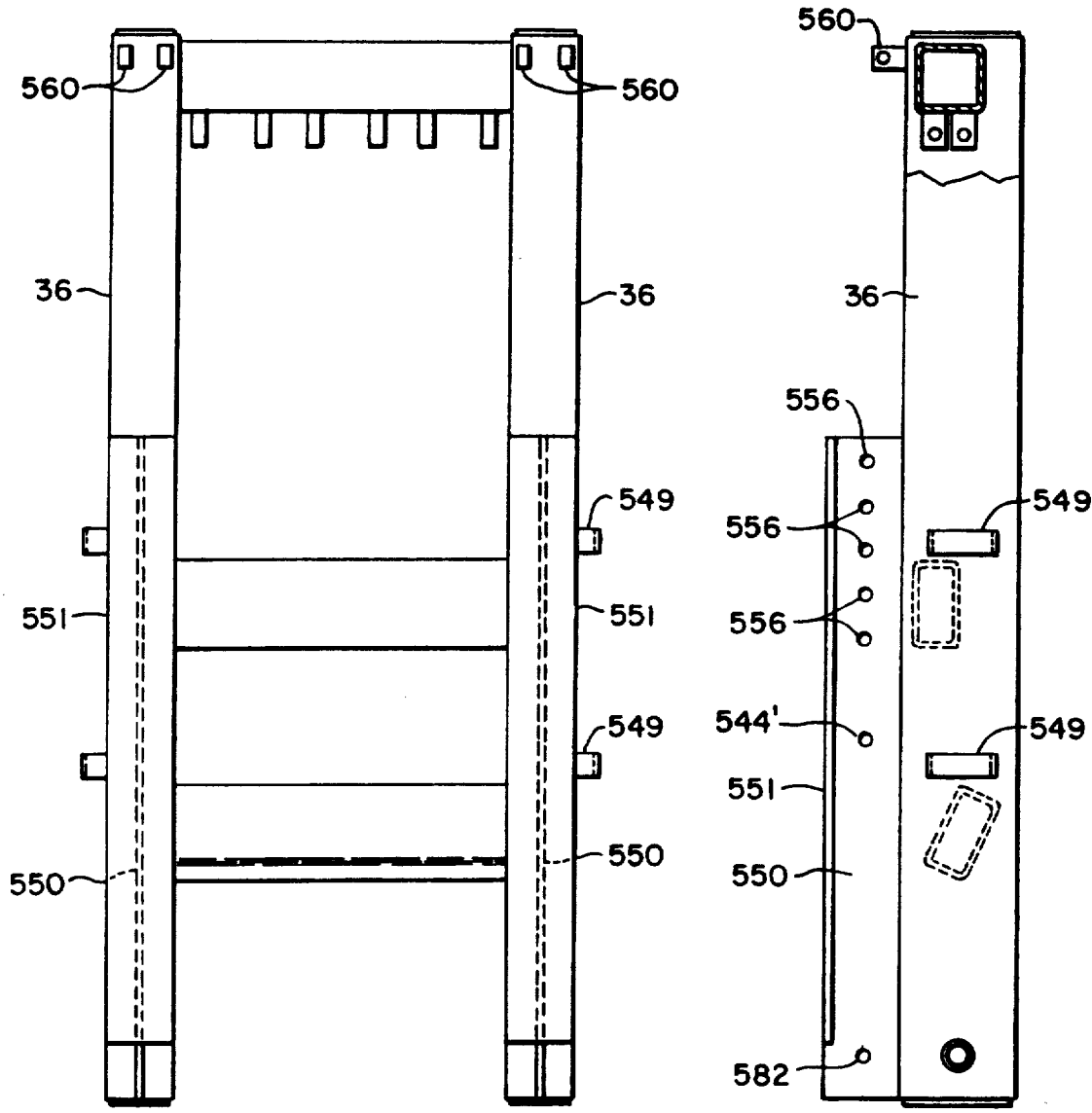
FIG. 42 is a fragmentary front view, partly in phantom, of an upright portion of the collapsable boom assembly embodiment of FIG. 40.
FIG. 43 is a side elevational view, partly broken away, partly in section and partly phantom, of the upright portion of FIG. 42.

With reference to FIGS. 42 and 43, a T-beam structure 550 is welded at the rear of the uprights to form a vertical guide which is slidably received in the channels 542 of the mainframe assembly. The T-shaped guide beam 550 having a frontal elongated guide rail 551 is vertically positionable at selected vertical positions determined by spaced apertures 556 and secured by means of a pin 558, which extends through the opposed openings 544 and the aligned selected aperture. The uprights and pivotally connected receiver legs are generally similar to those previously described. A portion of the front surface of guide rail 551 of the guide beam engages the guide plate 539 in a generally surface-to-surface relationship. Likewise the rear guide surface of rail 551 slides against the slide blocks 540 and wear pads 557. Thus, the effective vertical height of the boom assembly may be adjusted by hydraulic cylinders 512 and secured by aligning the openings 544 and the apertures 556 of the captured guide beam and inserting the pins 558 through the aligned openings and apertures. The blocks 540 and pads 557 facilitate the sliding positioning of the upright/leg assembly with the main mounting frame. The plates 539, blocks 540 and keepers 555 cooperatively function to capture the guide beam 550.

A second set of ears 560 projects forwardly at the top portion of the uprights for pivotally receiving a second pair of hydraulic cylinders 562 having piston rods 564. The outer ends of the piston rods 564 pivotally connect with a pair of upwardly projecting ears 566 mounted to the mainframe beams 534.

Figure 44:
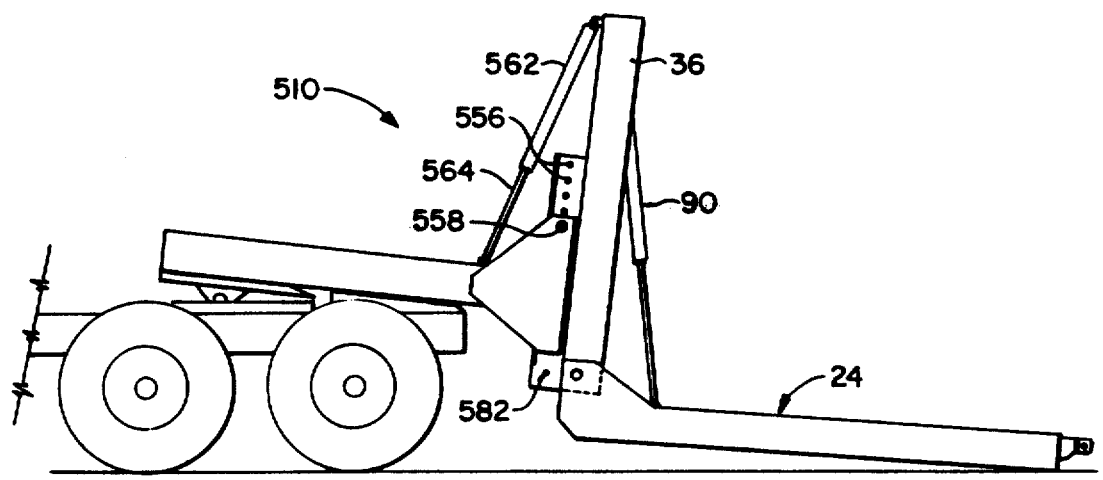
FIG. 44 is a side elevational view of the collapsable towing boom assembly embodiment illustrated in the extended towing position and mounted to a portion of a tractor.
Figure 45:
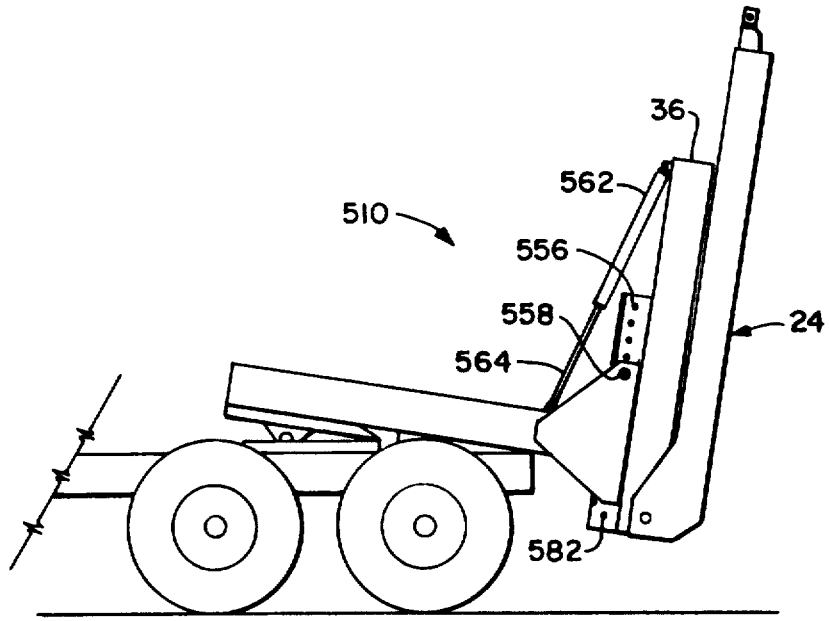
FIG. 45 is a side elevational view of the collapsable towing boom assembly and tractor of FIG. 44, illustrating a first folded stage.
Figure 46:
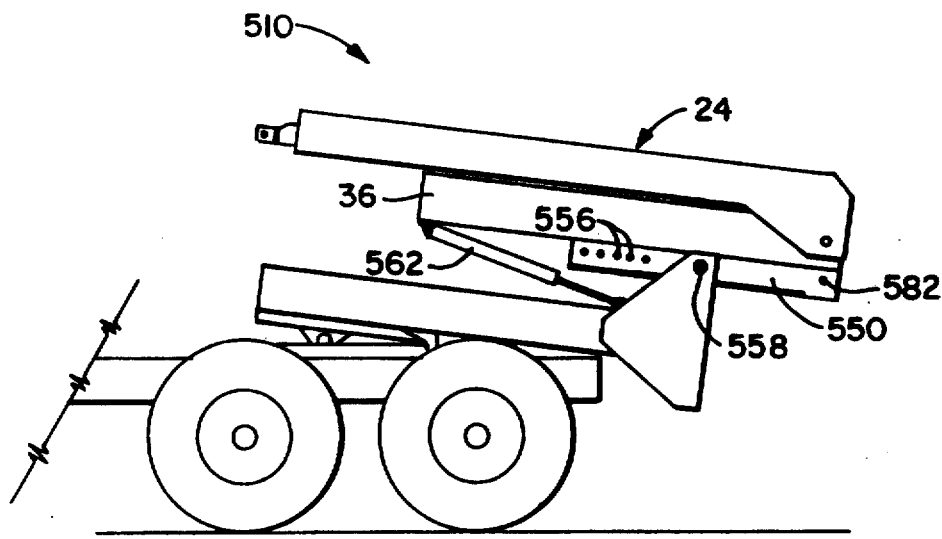
FIG. 46 is a side elevational view of the collapsable boom assembly and tractor of FIG. 44, illustrating in a subsequent folded stage.

With reference to FIG. 45, the boom assembly 510 may be collapsed to the storage configuration by angularly pivoting the legs to the upright position generally parallel to the uprights 36. The pivoting is accomplished as previously described by retracting the hydraulic cylinders 90 (FIG. 44). The hydraulic cylinders 562 remain extended. The next step in the collapsing sequence is illustrated in FIG. 46 wherein the second set of hydraulic cylinders 56 has been retracted forcing the uprights 36 and leg assembly 2 to pivot by engaging the pivot pin through openings 544 and 544' and exposing the gap at the bottom of rail 551 to allow the keepers 555 to pivot away from the guide beam 550. The blocks 540 pivot about the spindles to allow for the pivoting of the upright 36 relative to the beams 534.

Figure 47:
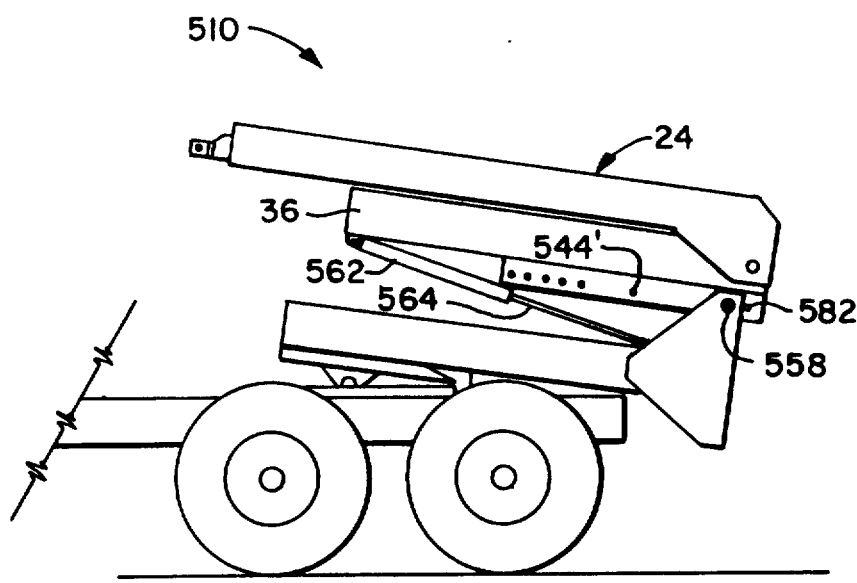
FIG. 47 is a side elevational view of the collapsable towing boom assembly and tractor portion of FIG. 44, illustrating a final collapsed stage.

The final step in the collapsing sequence is illustrated in FIG. 47. The pivot pin 558 has been removed from the openings 544 and the apertures 554', and the hydraulic cylinders 562 have been actuated to extend the rods 564 to thereby slide the uprights/leg assembly via the guide beam 550 along the slide blocks 540 to the compact folded position of FIG. 47. A laterally projecting stud 582 or clevis at the bottom of the guide beam prevents the upright/leg assembly section of the boom assembly from slidably disengaging from the main beam/fifth wheel section. An H-shaped stand (not illustrated) may be inserted to support the leg assembly 24 during transportation or storage.

Figure 48:
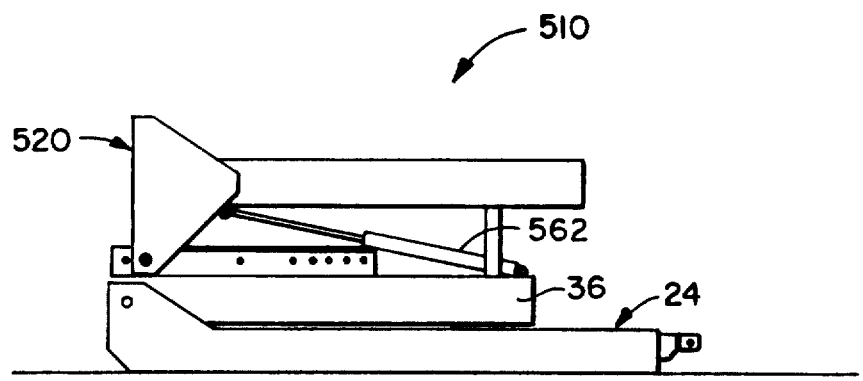
FIG. 48 is a side elevational view of the collapsable boom assembly of FIG. 40 illustrating a collapsed storage mode.

The fully collapsed boom assembly 510 may be positioned so that the leg assembly 24 is on the bottom as illustrated in FIG. 48. The later position provides an efficient storage and stacking mode for multiple assemblies.

It will be appreciated that the boom assembly may be efficiently expanded to the towing mode by reversing the foregoing described collapsing sequence.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A boom assembly for towing a vehicle having a frame and a front wheel portion, said boom assembly comprising:

main frame means comprising a beam structure and an upright structure extending generally perpendicular thereto;

attachment means mounted to said main frame means for attaching said main frame means to a fifth wheel;

lift leg means comprising a pair of lift legs pivotally mounted at a lower portion of said upright structure and having a rear terminal end, wheel assembly means mounted to said lift leg means, said wheel assembly means comprising a pair of wheels which are variably positionable in relation to said lift legs;

second securement means for securing a portion of the vehicle frame which is longitudinally spaced from said front wheel portion to said lift leg means;

hydraulic means pivotally connecting said main frame means and said lift leg means for pivoting said legs at a first retracted position, a second extended position wherein said legs essentially rest on the ground when the main frame means is mounted to a fifth wheel, and a third extended position having an angle greater than the second position which forces the legs to an elevated position which forces the legs to an elevated position when the vehicle is secured to the first and second securement means of said leg means; and lock means extending between said main frame means and said leg means for locking said third pivot position.

2. The boom assembly of claim 1 wherein said lift leg means further comprises a cross beam connecting said legs and said wheel assembly means is mounted to said cross beam.

3. The boom assembly of claim 1 wherein said wheel assembly comprises a leaf spring and said wheels are mounted at opposed positions of said spring.

4. The boom assembly of claim 1 wherein said lift leg means further comprises an extension member slidably receivable in each of said lift legs and variably positionable relatively thereto, each said extension member mounting a roller which slides in a corresponding leg.

5. The boom assembly of claim 4 further comprising a wear plate mounted in each said leg, said corresponding extension member being partially supported on said plate and slidable therealong.

6. The boom assembly of claim 1 wherein said second securement means comprises a chain and a hook connected to said chain, said hook being configured to lock against the vehicle frame.

7. The boom assembly of claim 1 wherein said lock means comprises a pair of telescopic tubes and a latch mounted to one of said tubes for locking the tubes at a plurality of selected positions.

8. The boom assembly of claim 7 wherein the other said tube has slot means defining a plurality of slots and at said selected positions, the latch drops into a said slot.

9. The boom assembly of claim 1 wherein said attachment means is mounted to the underside of said beam structure.

10. The boom assembly of claim 1 wherein said first securement means comprises a base which is selectively fixedly positionable at a range of selected positions of said leg means and a socket and support means insertable in said socket and adjustable at a plurality of fixed positions relative to said socket.

11. The boom assembly of claim 10 wherein a leg defines a row of aligned openings and said base further mounts a spring loaded pin insertable in a said opening and a threaded pin simultaneously insertable in another said opening.

12. The boom assembly of claim 10 wherein said first support means comprises a generally U-shaped catch, said support member defines a plurality of apertures, and said socket has a recess, and a pin is insertable in a selected aperture and seatable in said recess to fix the vertical position of said catch.

13. A boom assembly for towing a vehicle having a frame and a front wheel portion, said boom assembly comprising:
   main frame means comprising a beam structure and an upright structure extending generally perpendicular thereto;
   attachment means mounted to said main frame means for attaching said main frame means to a fifth wheel;
   lift leg means pivotally mounted at a lower portion of said upright structure and having a rear terminal end;
   first securement means for engaging the underside of the front wheel portion of the vehicle to said lift leg means;
   second securement means for securing a portion of the vehicle frame which is longitudinally spaced from said front wheel portion to said lift leg means, said second securement means comprising flexible connector means and a hook pivotally mounted to said connector means, said hook being shaped to lockably engage against a medial portion of the frame and a lower support flange of the frame at a fixed pivotal position upon exertion of a downward force on said connector; and
   hydraulic means pivotally connecting said main frame means and said lift leg means for pivoting said leg means at a first retracted position, a second extended position wherein said leg means rests on the ground when the main frame means is mounted to a fifth wheel, and a third extended position having an angle greater than the second position which forces the leg means to an elevated position when the vehicle is secured to the first and second securement means of said leg means.

14. The boom assembly of claim 13 further comprising lock means extending between said main frame means and said leg means for locking said leg means at said third pivot position and wherein said lock means comprises a pair of telescopic tubes and a latch mounted to one of said tubes for locking the tubes at a plurality of selected positions.

15. The boom assembly of claim 13 wherein said lift leg means further comprises a pair of legs and an extension member slidably receivable in each of said legs and variably positioned relatively thereto, each said extension member mounting a wheel which rolls interiorly of said corresponding leg.

16. The boom assembly of claim 13 wherein said first securement means comprises receiver means which is lockable by two spaced lock pins at a plurality of selected positions of said leg means.

17. The boom assembly of claim 16 wherein said receiver means comprises a support means having a variable height adjustment.

18. A boom assembly for towing a vehicle having a frame and a front wheel portion, said boom assembly comprising:
   main frame means comprising a beam structure and an upright structure extending generally perpendicular thereto;
   attachment means mounted to said main frame means for attaching said main frame means to a fifth wheel;
   lift leg means comprising at least one leg, an offset structure extending from said leg and pivot means for mounting said leg in offset relationship at a lower portion of said upright structure;
   first securement means for engaging the underside of the front wheel portion of the vehicle to said lift leg means, said first securement means comprising a catch which is selectively positionable at a plurality of fixed positions relative to the lift leg means;
   second securement means for securing a portion of the vehicle frame which is longitudinally spaced from said front wheel portion to said lift leg means; and
   hydraulic means connecting said main frame means and said lift leg means for pivoting said leg means at a first retracted position above the ground when the attachment means is mounted to a fifth wheel, a second extended position wherein said leg means rests on the ground when the attachment means is mounted to the fifth wheel, and a third extended position having an angle greater than the second position which forces the leg means to an elevated position above the ground when the attachment means is mounted to the fifth wheel and the vehicle is secured to the first and second securement means of said leg means.

19. The boom assembly of claim 18 wherein said first securement means comprises a socket, a support member extending from said catch insertable in said socket, and said support member defines a plurality of vertically spaced apertures for receiving a pin for selectively fixing the vertical position of said catch.

20. The boom assembly of claim 19 wherein said first securement means comprises a base which is lockable by a pair of spaced pins at a selected position of said lift leg means.

21. A boom assembly for towing vehicles comprising:
   main frame means comprising a beam structure and an upright structure extendable generally perpendicular thereto, said upright structure being pivotal relative to said beam structure;

attachment means mounted to said main frame means for attaching said main frame means to a fifth wheel;

lift leg means comprising a pair of lift legs pivotally mounted at a lower portion of said upright structure;

securement means for engaging the vehicle to said lift leg means; and first hydraulic means connecting said main frame means and said lift leg means for pivoting said legs at a first retracted position, a second extended position wherein said legs essentially rest on the ground when the frame means is mounted to a fifth wheel, and a third extended position having an angle greater than the second position which forces the legs to an elevated position when the vehicle is secured to the securement means.

22. The boom assembly of claim 21 further comprising second hydraulic means connected to said beam structure and upright structure for pivotally retracting said upright structure to an orientation generally parallel to said beam structure.

23. The boom assembly of claim 22 further comprising positioning means for selectively positioning said upright structure relative to said beam structure at a plurality of upright positions.

24. The boom assembly of claim 23 further comprising a guide member fixedly mounted to said upright structure and wherein said positioning means comprises a pair of plates mounted a pair of opposed sliders and said guide member is displaceable against said sliders.

25. The boom assembly of claim 24 wherein said guide member comprises aperture means defining a plurality of apertures and said upright structure is fixable at a selected position by means of a pin inserted in a selected aperture.

26. The boom assembly of claim 24 wherein said guide member comprises a T-shaped structure.

27. The boom assembly of claim 26 wherein said guide member is captured by said plates and sliders.

28. The boom assembly of claim 27 further comprising stop means for limiting the sliding travel of said upright structure relative to said beam structure.

29. The boom assembly of claim 22 wherein said second hydraulic means is actuatable to slide said upright structure in a direction generally parallel to said beam structure.

30. A boom assembly for towing vehicles comprising:

main frame means comprising a beam structure and an upright structure extendable generally perpendicular thereto, said upright structure being variably positionable at a plurality of fixed positions relative to said beam structure;

attachment means mounted to said main frame means for attaching said main frame means to a fifth wheel;

lift leg means comprising a pair of lift legs pivotally mounted at a lower portion of said upright structure;

securement means for engaging the vehicle to said lift leg means; and first hydraulic means connecting said main frame means and said lift leg means for pivoting said legs at a first retracted position, a second extended position wherein said legs essentially rest on the ground when the frame means is mounted to a fifth wheeel, and a third extended position having an angle greater than the second position which forces the legs to an elevated position when the vehicle is secured to the securement means.

31. The boom assembly of claim 30 wherein said upright structure is pivotable relative to said beam structure and said upright structure is transformable to an orientation generally parallel to said beam structure.

32. The boom assembly of claim 30 wherein said upright structure comprises a pair of uprights and further comprising a guide member fixedly mounted to each said upright, and wherein said beam structure further mounts a pair of plates and opposed sliders for each guide member and each said guide member is displaceable against a pair of said sliders.

33. The boom assembly of claim 32 wherein each said guide member comprises aperture means defining a plurality of apertures, and said upright structure is removably fixed at a selected position by means of a pin inserted in a selected aperture.

34. The boom assembly of claim 33 wherein each said guide member comprises a T-shaped structure.

35. The boom assembly of claim 34 wherein each said guide member is captured by said plates and sliders.

* * * * *

UNITED STATES PATENT AND TRADEMARK OFFICE
CERTIFICATE OF CORRECTION

PATENT NO.  : 5,249,911
DATED       : October 5, 1993
INVENTOR(S) : Martin A. Marola It is certified that error appears in the above-indentified patent and that said Letters Patent is hereby corrected as shown below:

Column 12, lines 46 and 47, after "position" delete "which forces the legs to an elevated position".

Signed and Sealed this

Tenth Day of December, 1996

Attest:

BRUCE LEHMAN

*Attesting Officer*  *Commissioner of Patents and Trademarks*